United States Patent [19]

Suguri et al.

[11] Patent Number: 6,026,425
[45] Date of Patent: Feb. 15, 2000

[54] NON-UNIFORM SYSTEM LOAD BALANCE METHOD AND APPARATUS FOR UPDATING THRESHOLD OF TASKS ACCORDING TO ESTIMATED LOAD FLUCTUATION

[75] Inventors: Toshihiko Suguri, Yokosuka; Hiroyuki Yamashita; Yasushi Okada, both of Yokohama, all of Japan

[73] Assignee: Nippon Telegraph and Telephone Corporation, Tokyo, Japan

[21] Appl. No.: 08/901,536

[22] Filed: Jul. 28, 1997

[30] Foreign Application Priority Data

Jul. 30, 1996 [JP] Japan .................................. 8-200451

[51] Int. Cl.⁷ .................................................. G06F 13/00
[52] U.S. Cl. ......................... 709/105; 709/223; 709/251
[58] Field of Search .............................. 395/675, 200.53, 395/200.56, 200.55, 200.81

[56] References Cited

U.S. PATENT DOCUMENTS

| | | | |
|---|---|---|---|
| 4,811,337 | 3/1989 | Hart . | |
| 5,031,089 | 7/1991 | Liu et al. | 395/200.56 |
| 5,155,858 | 10/1992 | DeBruler et al. | 395/675 |
| 5,164,983 | 11/1992 | Brown et al. | 379/265 |
| 5,283,897 | 2/1994 | Georgiadis et al. | 395/675 |
| 5,557,798 | 9/1996 | Skeen et al. | 705/35 |
| 5,657,142 | 8/1997 | Fahim | 359/110 |
| 5,687,309 | 11/1997 | Chen | 395/182.02 |
| 5,774,668 | 6/1998 | Choquier et al. | 395/200.53 |
| 5,839,120 | 11/1998 | Thearling | 706/13 |

FOREIGN PATENT DOCUMENTS

| | | |
|---|---|---|
| 5-143559 | 6/1993 | Japan . |
| 7-152700 | 6/1995 | Japan . |
| 7-225746 | 8/1995 | Japan . |

OTHER PUBLICATIONS

P. Krueger, et al.; "Adaptive Location Policies for Global Scheduling", IEEE Transactions on Software Engineering, vol. 20, No. 6, pp. 432–444, Jun., 1994.

*Primary Examiner*—Zarni Maung
*Attorney, Agent, or Firm*—Finnegan, Henderson, Farabow, Garrett & Dunner, L.L.P.

[57] ABSTRACT

A load balancing method and apparatus are provided, by which loads in a wide range of the entire system can be balanced with a small overhead with respect to load balancing processing, and the mean response time of the entire system can be shortened. The method has the steps of (i) estimating a load of the present node based on the number of tasks being or waiting to be processed and determining an estimated load value of the node; (ii) accepting a task passing through a logical ring network, and every time a task is accepted, comparing the estimated load value and a threshold value which is set with respect to the number of tasks existing in the node so as to limit the load of the node; and (iii) judging, based on a result of the comparison, whether the accepted task is handed over to a task processing unit, or is transmitted to the logical ring network again without handing over the task to the task processing unit. The threshold value may be changed in accordance with a change of the number of tasks passing through the logical ring network during a fixed period, or when a round trip task is detected.

63 Claims, 28 Drawing Sheets

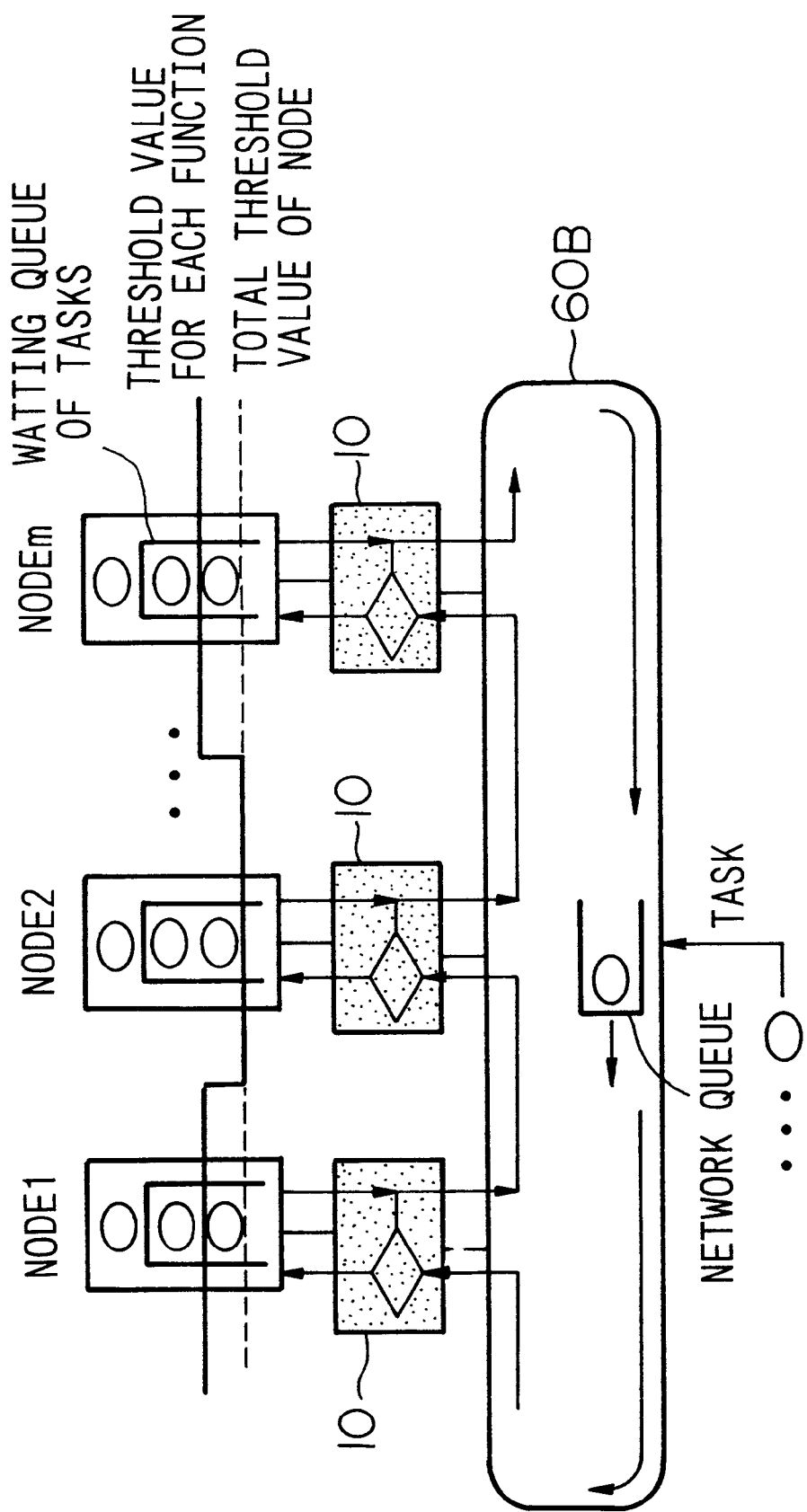

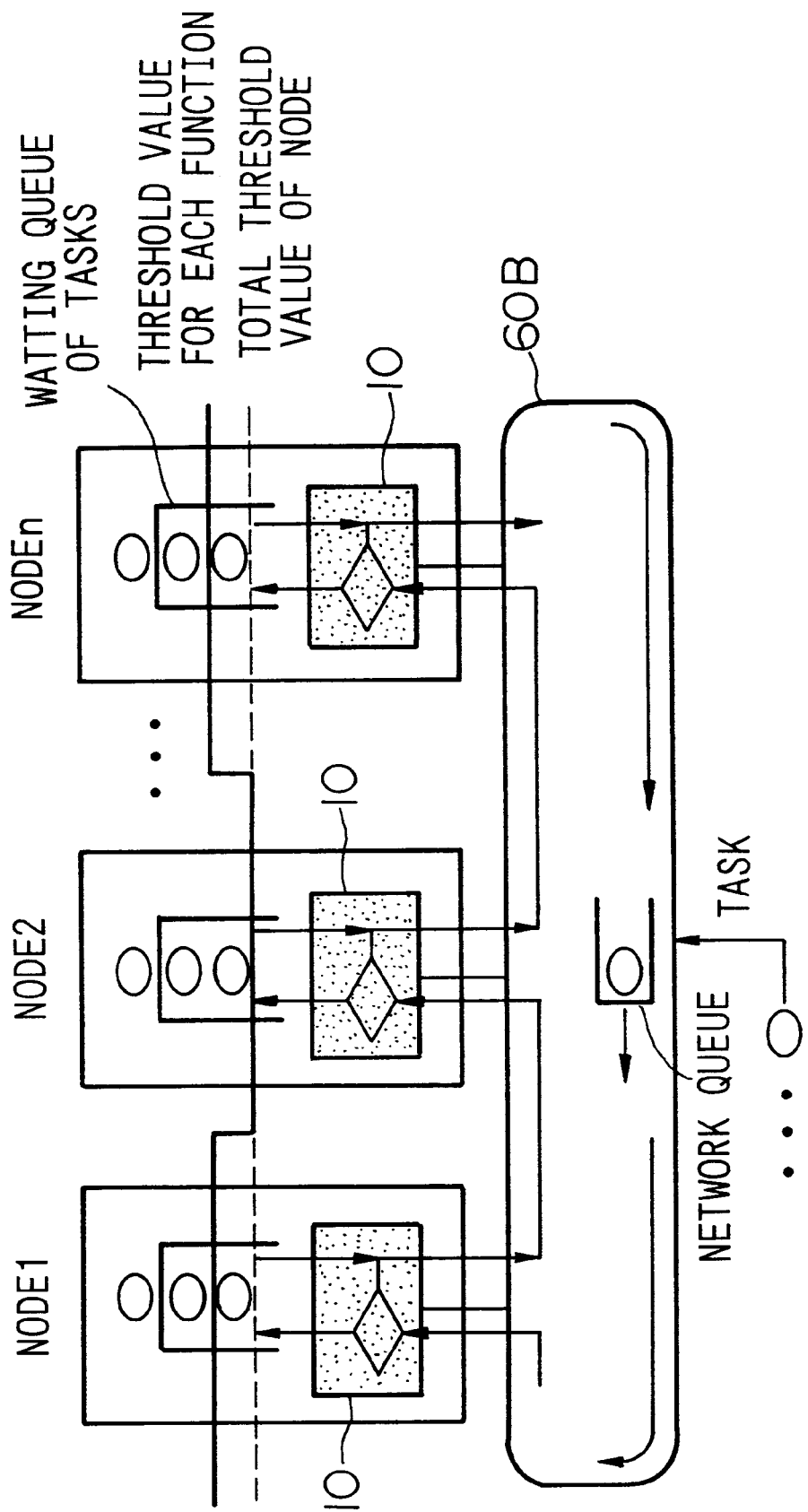

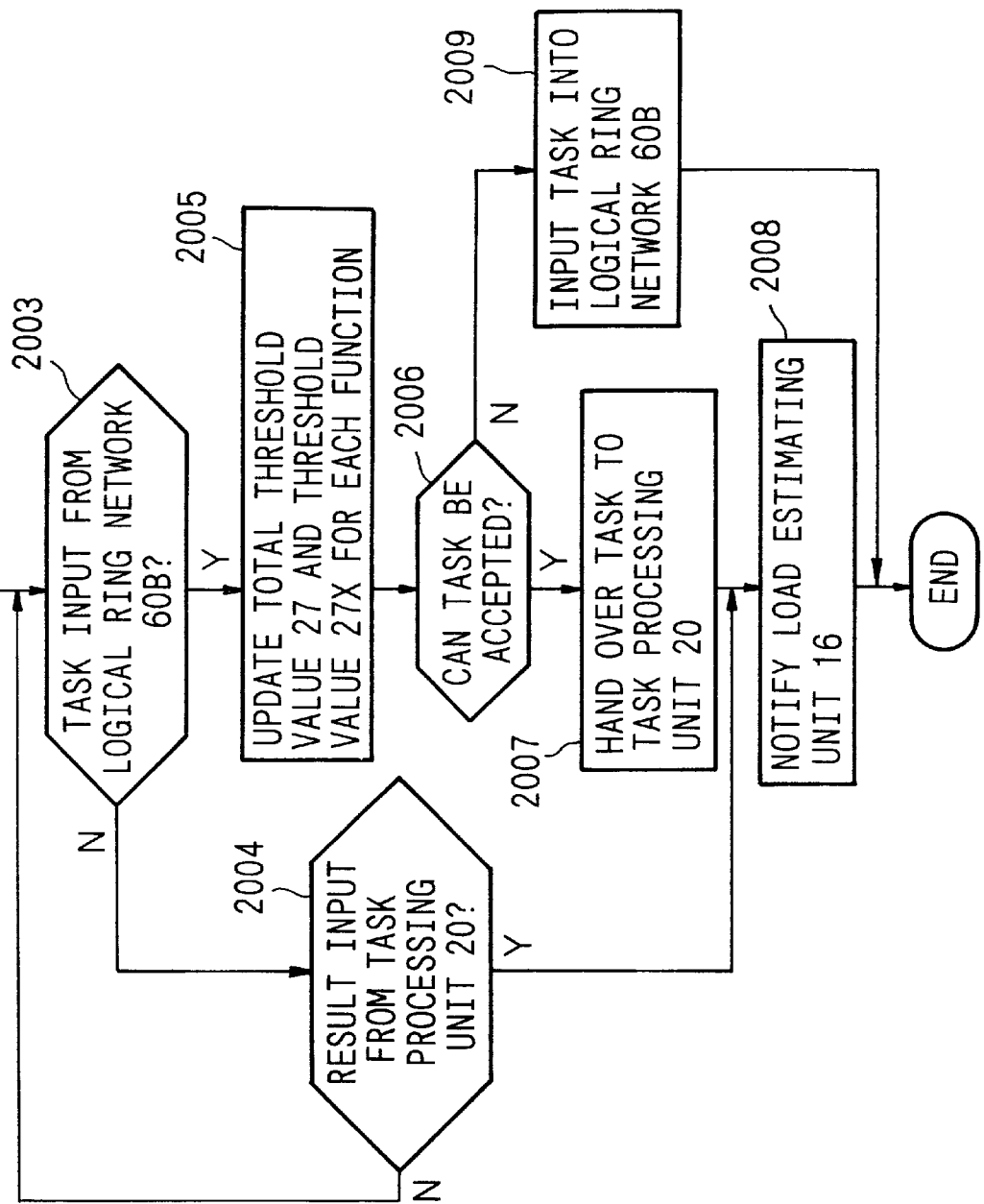

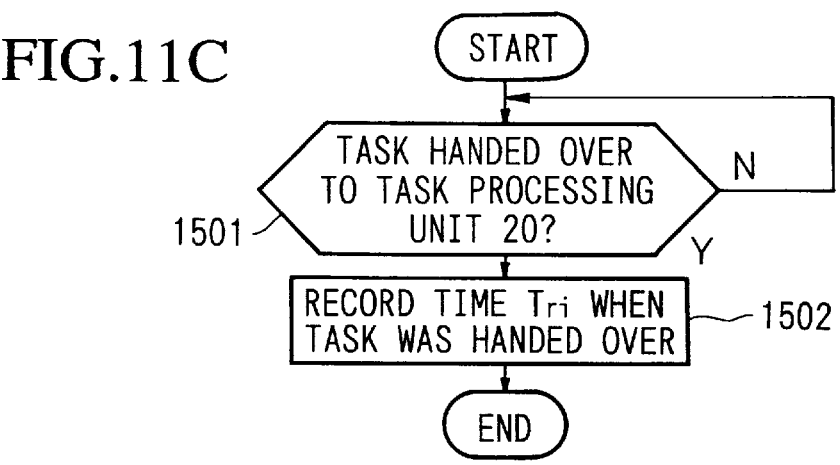
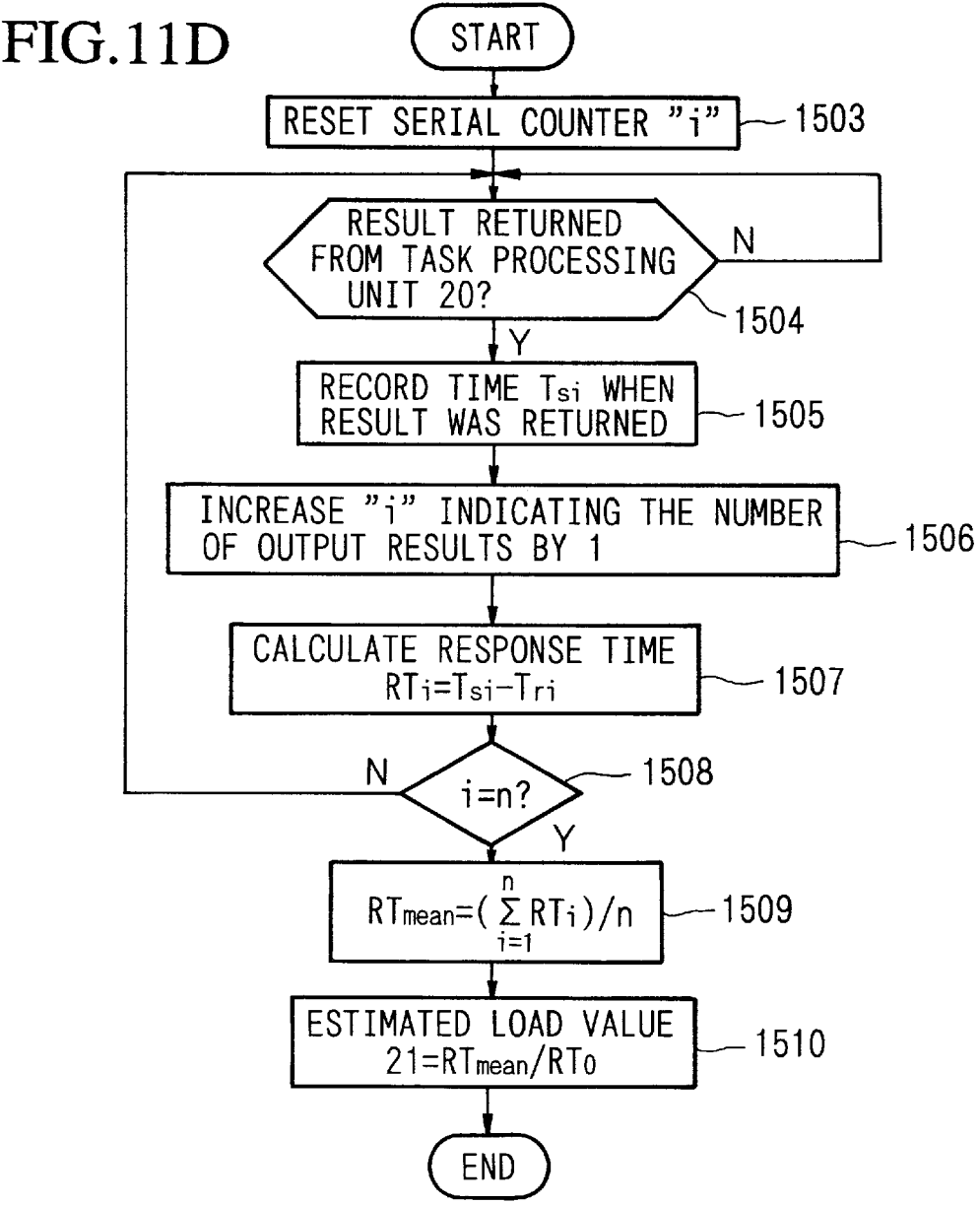

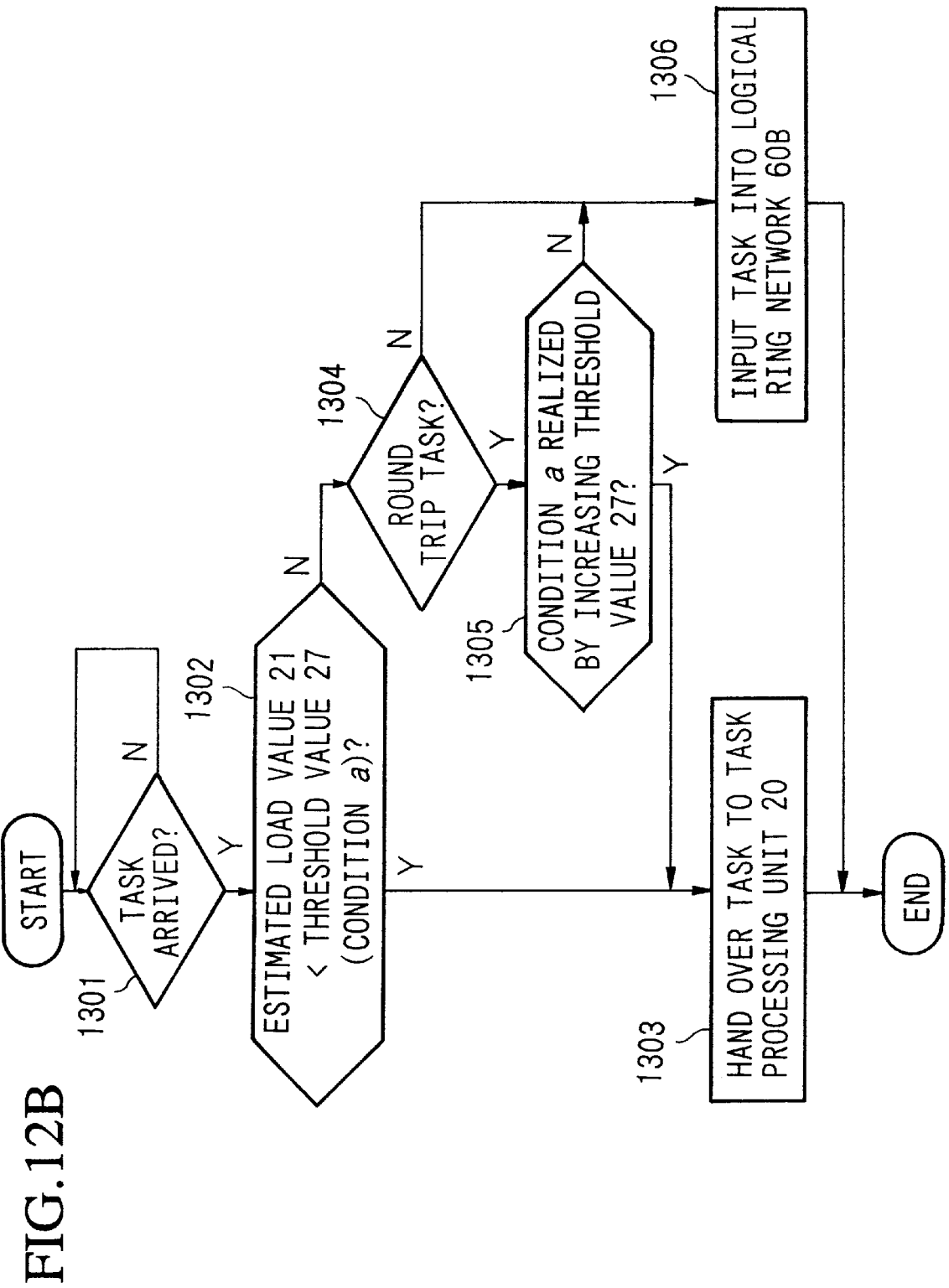

FIG.19

| LOAD FLUCTUATION OF ENTIRE SYSTEM (DEC=DECREASE, INC=INCREASE) | THE NUMBER OF ROUND TRIP TASKS | ESTIMATED PERFORMANCE LEVEL OF ENTIRE SYSTEM | CHANGE OF THRESHOLD STEP |
|---|---|---|---|
| DEC→INC | INCREASE | CONSTANT | NONE |
| DEC→INC | CONSTANT | INCREASE | DECREASE |
| DEC→INC | DECREASE | INCREASE | DECREASE |
| DEC→RAPID INC | INCREASE | CONSTANT | NONE |
| DEC→RAPID INC | CONSTANT | INCREASE | DECREASE |
| DEC→RAPID INC | DECREASE | INCREASE | DECREASE |
| INC→DEC | INCREASE | DECREASE | INCREASE |
| INC→DEC | CONSTANT | DECREASE | INCREASE |
| INC→DEC | DECREASE | CONSTANT | NONE |
| INC→RAPID DEC | INCREASE | DECREASE | INCREASE |
| INC→RAPID DEC | CONSTANT | DECREASE | INCREASE |
| INC→RAPID DEC | DECREASE | CONSTANT | NONE |
| RAPID DEC→GRADUAL DEC | INCREASE | CONSTANT | NONE |
| RAPID DEC→GRADUAL DEC | CONSTANT | INCREASE | DECREASE |
| RAPID DEC→GRADUAL DEC | DECREASE | INCREASE | DECREASE |
| GRADUAL DEC→RAPID DEC | INCREASE | DECREASE | INCREASE |
| GRADUAL DEC→RAPID DEC | CONSTANT | DECREASE | INCREASE |
| GRADUAL DEC→RAPID DEC | DECREASE | CONSTANT | NONE |
| RAPID INC→GRADUAL INC | INCREASE | CONSTANT | NONE |
| RAPID INC→GRADUAL INC | CONSTANT | CONSTANT | NONE |
| RAPID INC→GRADUAL INC | DECREASE | INCREASE | DECREASE |
| GRADUAL INC→RAPID INC | INCREASE | DECREASE | INCREASE |
| GRADUAL INC→RAPID INC | CONSTANT | CONSTANT | NONE |
| GRADUAL INC→RAPID INC | DECREASE | CONSTANT | NONE |

NON-UNIFORM SYSTEM LOAD BALANCE METHOD AND APPARATUS FOR UPDATING THRESHOLD OF TASKS ACCORDING TO ESTIMATED LOAD FLUCTUATION

BACKGROUND OF THE INVENTION

1. Field of the Invention

The present invention relates to load balancing methods and apparatus used for a computer system in which plural nodes (computers, in practice) are connected with each other via a network and each node processes an input task (message). This application is based on Japanese Patent Application No. Hei 8-200451, the contents of which are incorporated herein by reference.

2. Description of the Related Art

The computer systems in which plural computers (called "nodes", hereinafter) are connected to each other via a network are classified into two types according to the manner in which each task is accepted: one is a centralized arrival system in which all tasks are accepted by a single node (called a "task acceptance node") and the accepted tasks are distributed from the task acceptance node to other nodes; the other type is a distributed arrival system in which a task arrives at any node and the node accepts the task.

There are also two types of load balancing methods: one is a centralized control method in which one node in the system has load balancing processing equipment and only the node (having the load balancing processing equipment) performs load balancing processes; the other type is a distributed control method in which each node in the system has load balancing processing equipment and each node performs load balancing processes.

Regarding a load balancing method, used in such a computer system in which plural computers are connected with each other via a network, for balancing the load of each node by distributing loads of the entire system into each node and for minimizing a mean response time of the entire system, Japanese Patent Application, First Publication, No. Hei 7-152700 discloses a (performance-function uniform) system in which all nodes in the system are uniform in performance and functions, that is, possible functions to be processed are the same.

In such a performance-function uniform system, the system load can be balanced just by equalizing the number of tasks in each node. However, in a system in which nodes in the system are not uniform in their performance, processing times are different according to performance of each node; thus, the system load cannot be balanced just by equalizing the number of tasks of each node. If a load balancing method used for the performance-function uniform system is applied to such a "performance non-uniform" system, the following problems may occur.

1. Task assignment in accordance with performance of each node is not performed. Therefore, even if there is a node with high performance has reserve ability to process tasks, a task may be assigned to a node having lower performance. That is, if tasks are assigned to nodes with high performance, response times could be shorter and consequently, the mean response time of the system could be minimized. However, the minimization cannot be realized for the above reason.

2. Owing to the order of the nodes in the system arrangement, tasks may be assigned to the nodes starting at a node with lower performance and progressing to a node with higher performance. In this case, nodes with high performance are not sufficiently used, thus the mean response time cannot be minimized.

On the other hand, in a "function non-uniform" system (that is, the number and the kinds of executable tasks are different with respect to each node), the system load cannot be balanced by using the above-mentioned load balancing method used for a performance-function uniform system because the number of steps to be performed is different for each function, and because the number of nodes which can execute a function is different for each function in the system. If applying a load balancing method used for the performance-function uniform system to such a "performance uniform but function non-uniform" system, the following problems may occur.

1. In the above load balancing method used for the performance-function uniform system, tasks are assigned to each node without distinguishing tasks belonging to functions which many nodes in the system can execute from tasks belonging to functions which fewer nodes can execute. Therefore, even if it is possible to assign a "task belonging to a function which many nodes can execute" to a node which cannot execute a "task belonging to a function which fewer nodes can execute", the task (belonging to a function which many nodes can execute) may be assigned to a node which can execute tasks of both types, and thus a task belonging to the former type (that is, a task belonging to a function which fewer nodes can execute) might circulate in the network while waiting to be processed. In this case, the response time increases.

2. When the number of steps of an executable program to be performed is different for each function, a task having a large number of steps must be processed by the node with the lowest possible load at the time (that is, a node having sufficient resources for processing). However, in the load balancing method used for a function uniform system, tasks are assigned so as to equalize the number of tasks assigned to each node regardless of the number of steps of an executable program; thus, processing of an assigned task having a large total number of steps of an executable program may be delayed in the relevant node. Accordingly, the response time of a task assigned to such a node increases, thus the mean response time of the entire system is not minimized.

On the other hand, in order to balance loads in the distributed arrival system, it is necessary to transfer a task which arrived at any node to another node.

As a conventional transfer algorithm, "sender initiated" and "receiver initiated" algorithms are known. The sender initiated algorithm is effective when the load of the entire system is low. However, if the load of the entire system becomes high, the mean response time increases and the system becomes unstable. In contrast, the receiver initiated algorithm is effective when the load of the entire system is high. However, when the load of the entire system is low, the mean response time is larger than that of the sender initiated algorithm. In either algorithm, information relating to loads of other nodes is not managed, and after the necessity of task transfer occurs, selection of a source or destination node is started. Therefore, it takes a lot of time before actual task transfer is started, that is, before the load is balanced.

Furthermore, in the distributed control method, information exchange between a node and another node is performed so as to select a source or a destination node; thus, network traffic of the entire system increases. As a result, a time necessary for task transfer increases and the net amount of decrease of the mean response time is small.

That is, in the above-mentioned conventional load balancing methods, there has been a problem in that if the method is applied to a system in which nodes are non-uniform in performance, task assignment in consideration of performance of each node cannot be performed whereby mean response times are not balanced between the nodes and the means response time of the entire system is not minimized.

Also in the above-mentioned conventional load balancing methods, there has been another problem in that if the method is applied to a system in which nodes are non-uniform in the kinds and the number of executable functions, tasks are assigned without consideration of the number of the nodes which can execute each task, a load for each function, and the number of steps in an executable problem for each node; therefore, the response time of a function may be larger and loads of the nodes are not balanced and thus the mean response time of the entire system is not minimized.

SUMMARY OF THE INVENTION

It is an object of the present invention to provide load balancing methods and apparatus by which loads in a wide range (that is, from high to low) of an entire system can be balanced with a small overhead with respect to load balancing processing and the mean response time of the entire system can be shortened.

Another object of the present invention is to provide load balancing methods and apparatus which can effectively be applied to a performance non-uniform system consisting of nodes which are non-uniform in performance so as to balance the mean response times of the nodes and to realize minimization of the mean response time of the entire system.

A further object of the present invention is to provide load balancing methods and apparatus which can effectively be applied to a function non-uniform system in which nodes are uniform in performance but non-uniform in executable functions so as to realize minimization of the mean response time of the entire system and minimization of the mean response time relating to each function.

Therefore, the present invention provides a load balancing method used for a computer system in which plural processing nodes are connected to a logical ring network and when each node processes a task input from a terminal by using a task processing unit and returns a result to the terminal, the logical ring network logically transmits tasks in turn and in one direction, said load balancing method for equally distributing loads of the entire system into the nodes in the system, comprising the steps of:

(1) estimating a load of the present node based on the number of tasks being or waiting to be processed and determining an estimated load value of the node;
(2) accepting a task passing through the logical ring network, and every time a task is accepted, comparing the estimated load value and a threshold value which is set with respect to the number of tasks existing in the node so as to limit the load of the node; and
(3) judging, based on a result of the comparison, whether the accepted task is handed over to the task processing unit, or is transmitted to the logical ring network again without handing over the task to the task processing unit.

In the above method, the threshold value may be changed in accordance with a change of the number of tasks passing through the logical ring network during a fixed period, or when a round trip task is detected.

In such a case, it is also preferable that:
(1) when organization of the nodes in the computer system is modified by deleting or adding a node, a threshold step as an amount for changing the threshold value is updated based on a value with respect to performance of the node added or deleted; or
(2) all tasks passing through the logical ring network are monitored; a load fluctuation of the entire computer system and a modification of organization of the nodes in the system are estimated in accordance with a change of the number of all passed tasks and with a change of the number of round trip tasks; and the threshold step is updated based on a result of the estimate.

The present invention also provides a load balancing apparatus provided for a computer system similar to the above, said load balancing apparatus, provided between the task processing unit in each node and the logical ring network, for equally distributing loads of the entire system into the nodes in the system, the apparatus comprising:
(1) load estimating means for estimating a load of the present node based on the number of tasks being or waiting to be processed and for determining an estimated load value of the node;
(2) threshold value storage means for holding a threshold value with respect to the number of tasks existing in the node so as to limit the load of the node; and
(3) task acceptance control means for accepting a task passing through the logical ring network, and comparing the estimated load value and the threshold value of the node every time the control means accepts a task, and for judging, based on a result of the comparison, whether the accepted task is handed over to the task processing unit, or is transmitted to the logical ring network again without handing over the task to the task processing unit.

The above apparatus may further comprise threshold value setting means for setting the threshold value stored in the threshold value storage means. In this case, it is preferable to provide threshold step storage means for holding a threshold step which is an amount by which the threshold value is changed by the threshold value setting means, and to further provide:
(1) threshold step setting means which updates the threshold step stored in the threshold step storage means when organization of the nodes in the computer system is modified by deleting or adding a node, based on a value with respect to performance of the node added or deleted; or
(2) threshold step setting means which monitors all tasks passing through the logical ring network and estimates a load fluctuation of the entire computer system and a modification of organization of the nodes in the system in accordance with a change of the number of all passed tasks and with a change of the number of round trip tasks, and which updates the threshold step (stored in the threshold step storage means) based on a result of the estimate.

According to the above inventions, the following effects can be obtained.
(1) Task assignment according to the performance and load of each node is performed; thus, tasks are assigned to the nodes on the basis of performance levels in order from highest to lowest. Therefore, the response time of each task is minimized, and thus the mean response time of the entire system is minimized.
(2) Tasks are assigned to the nodes in the order of performance levels thereof regardless of the arrangement order of the nodes; thus, it is possible to make full use of high-performance nodes.

(3) Assignment of (i) tasks belonging to functions which many nodes in the system can execute and (ii) tasks belonging to functions which fewer nodes can execute is optimized by changing the number of tasks, which each node accepts, in accordance with (i) (for each function in the system,) the number of nodes which can execute the function and (ii) the load for each function. In this case, the response time with respect to a task belonging to a function which fewer nodes can execute does not become large; and (4) The total number of steps in executable programs of each node is balanced by changing the threshold value of each node for each function in accordance with the number of steps of an executable program and load fluctuation of a self-executable function. Therefore, the mean response time of the entire system is minimized.

The present invention also provides a storage medium storing a computer program for making a computer execute the above method.

BRIEF DESCRIPTION OF THE DRAWINGS

FIG. 4 is a diagram showing an example of the arrangement with respect to the apparatuses of FIGS. 1–3.

FIG. 5 is also a diagram showing an example of the arrangement with respect to the apparatuses as shown in FIGS. 1–3.

FIGS. 7A and 7B are flowcharts of general operations of the load balancing apparatus as shown in FIG. 2.

FIGS. 11A–11D are flowcharts of the operational example 3 of the load estimating unit.

FIGS. 12A and 12B are flowcharts of the operational example 1 of the task acceptance control unit.

FIG. 19 is a list showing examples for setting the threshold value based on combinations of the load fluctuation of the entire system and the detection situation of the round trip task.

DESCRIPTION OF THE PREFERRED EMBODIMENTS

Hereinbelow, preferred embodiments of the present invention will be explained in detail with reference to the drawings.

Figure 1:
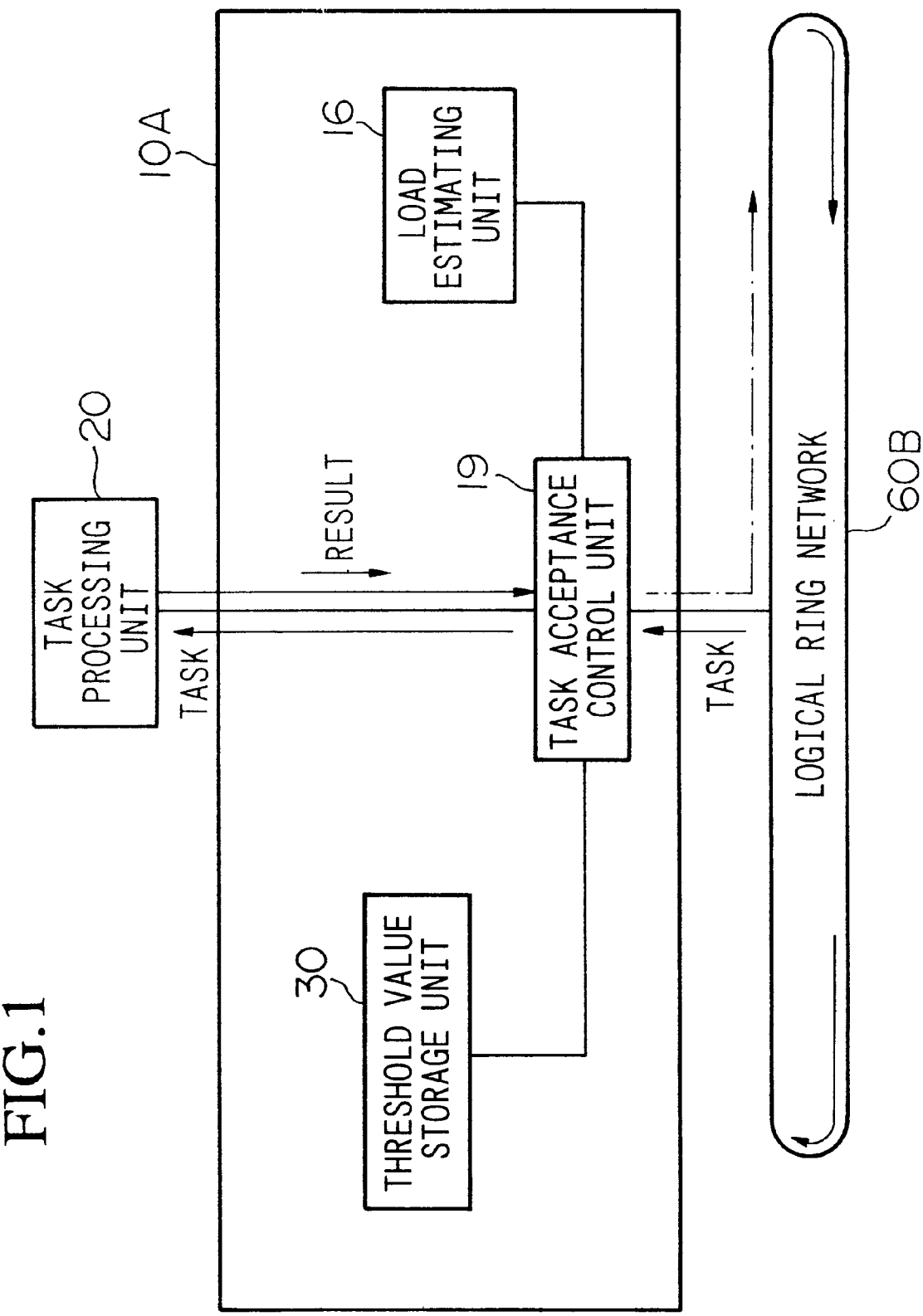
FIG. 1 is a diagram showing the configuration of a load balancing apparatus provided for a computer system, as an embodiment of the present invention.
Figure 2:
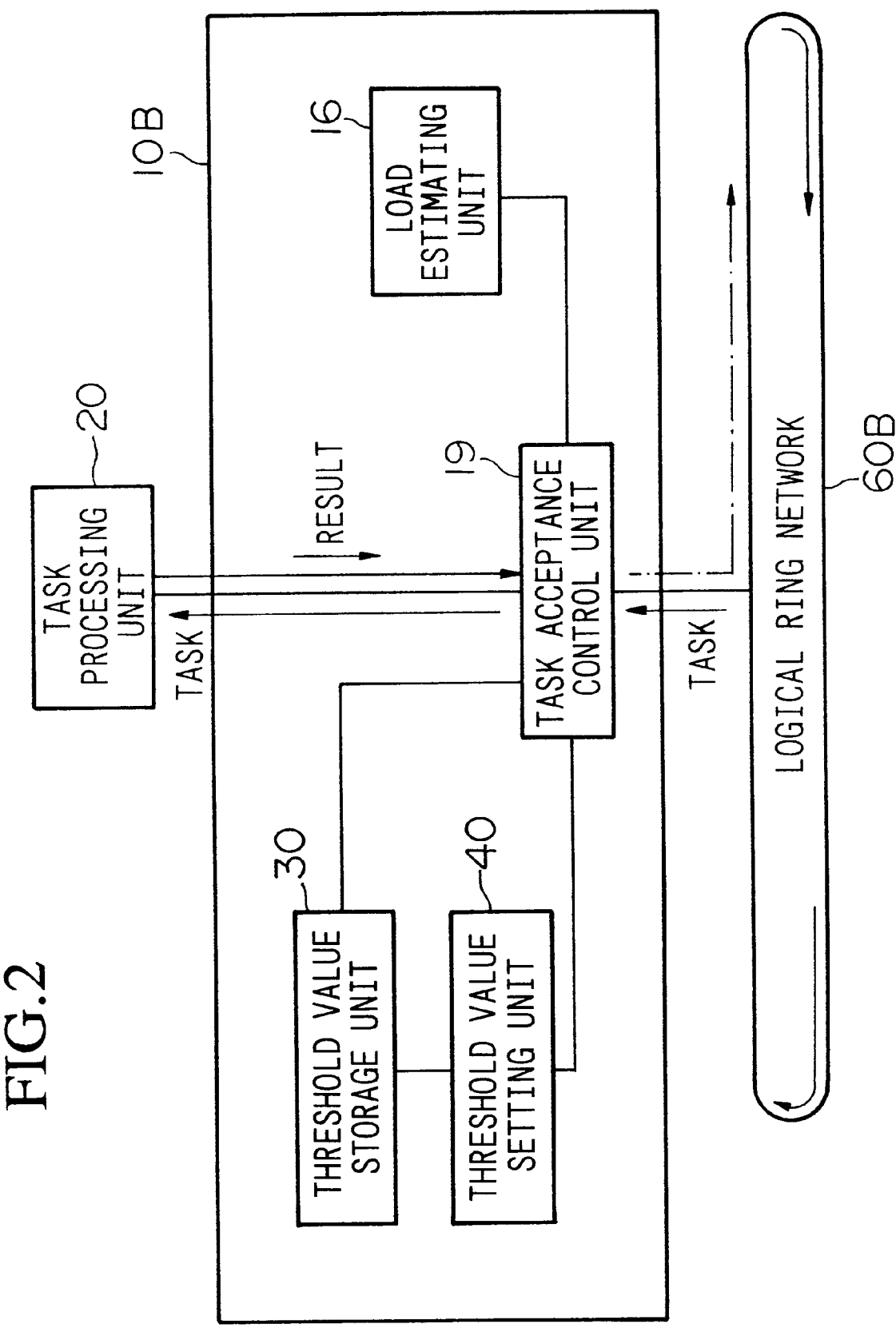
FIG. 2 is a diagram showing the configuration of a load balancing apparatus provided for a computer system, as another embodiment of the present invention.
Figure 3:
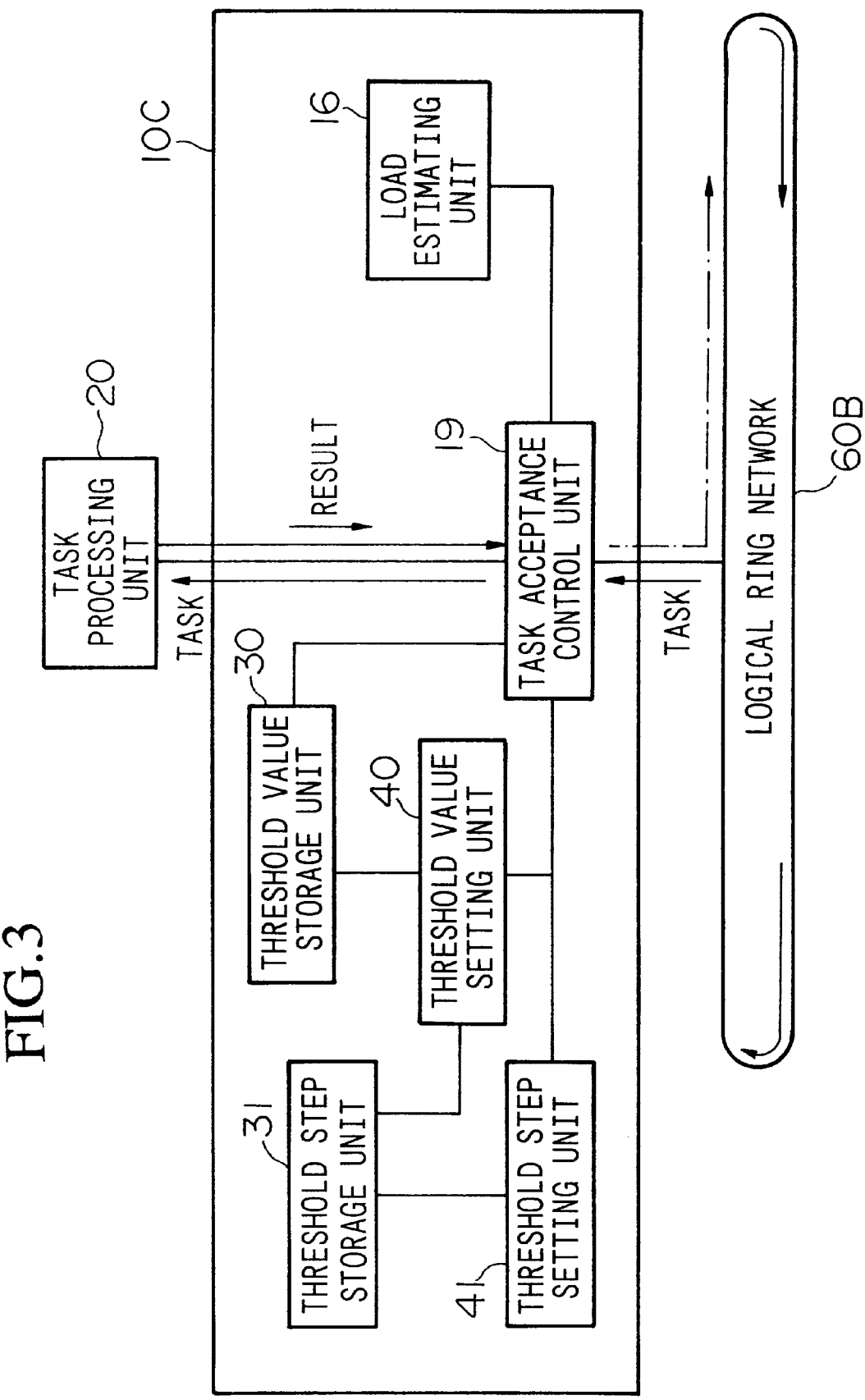
FIG. 3 is a block diagram showing the configuration of a load balancing apparatus provided for a computer system, as yet another embodiment of the present invention.

FIGS. 1–3 are diagrams showing structures of three examples of the load balancing apparatus 10 (i.e., 10A–10C) according to the present invention, and FIGS. 4 and 5 are diagrams showing examples of the arrangement with respect to these apparatuses. That is, the load balancing apparatus 10 is arranged between logical ring network 60B and each node (in the case shown in FIG. 4), or is arranged in each node (in the case shown in FIG. 5).

Load balancing apparatus 10A consists of load estimating unit 16 for estimating the load of the present node, threshold value storage unit 30, and task acceptance control unit 19. In load balancing apparatus 10B, threshold value setting unit 40 is provided in addition to the above elements in apparatus 10A, and in load balancing apparatus 10C, threshold step storage unit 31 for storing a threshold step (value) which is a unit for changing the threshold value and threshold step setting unit 41 are provided in addition to the above elements in apparatus 10B. Here, in the arrangement of load balancing apparatus 10B, a threshold step storage unit may separately be provided outside the threshold value setting unit 40.

The system arrangements as shown in FIGS. 1–3 are examples belonging to the centralized arrival system, wherein after a task arrives at an entrance node, the task is input into logical ring network 60B by the entrance node and circulates around the logical ring network 60B. A task which has not yet made a round of logical ring network 60B after the task is input into the network is called a "normal task (message)", while a task which has made one or more rounds of the logical ring network 60B before being processed by any node is called a "round trip task (message)". When a round trip task is input into the entrance node, the entrance nodes marks it and input the task into logical ring network 60B again so that each node can distinguish between a normal task and a round trip task.

In addition, a distributed arrival system can easily be realized by modifying the centralized arrival system in a manner such that each node performs the task acceptance, the input of tasks into the logical ring network, and the marking of round trip tasks, which are performed by an entrance node in the centralized arrival system.

General Operations of Load Balancing Apparatus 10A

Figure 6B:
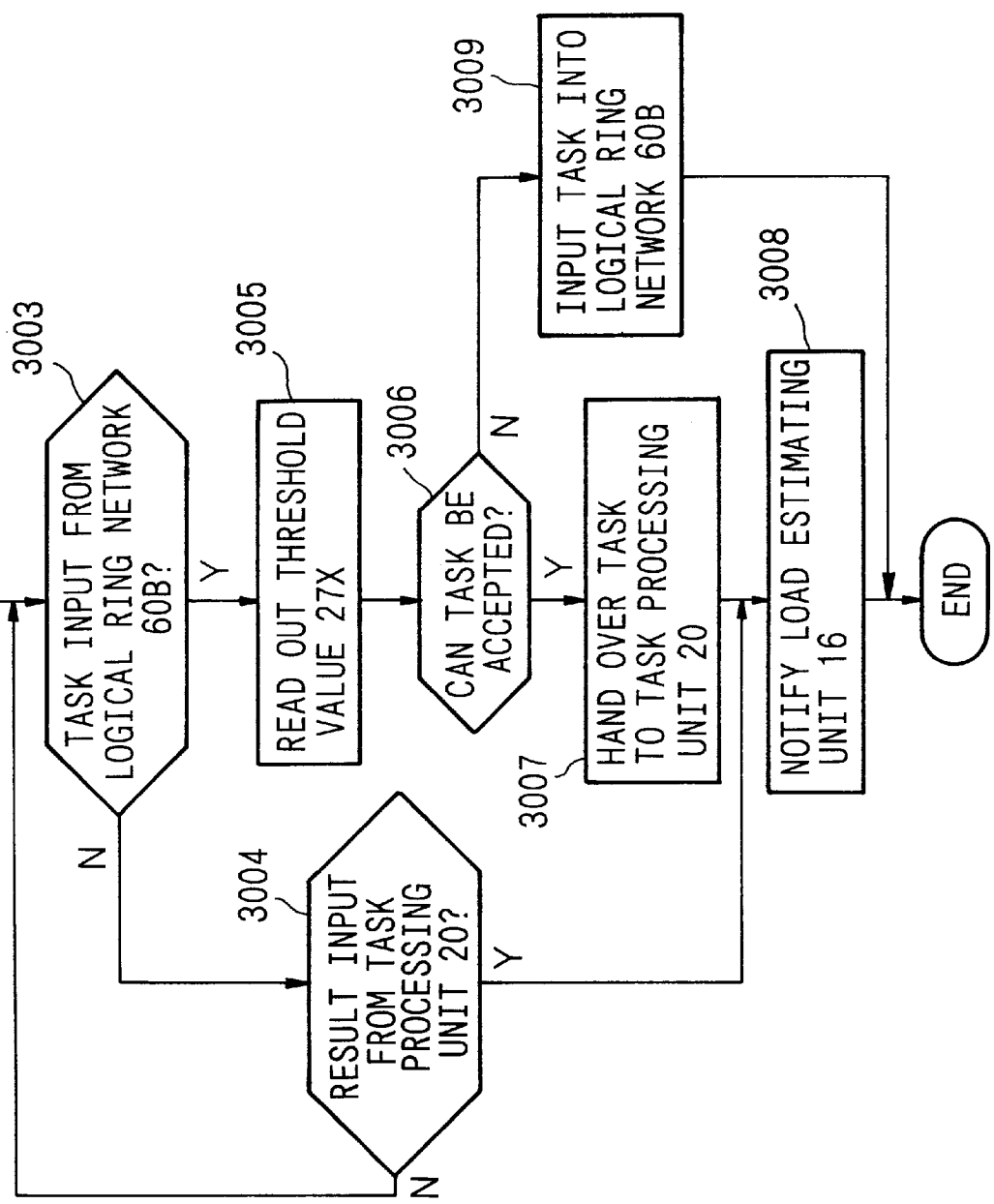
FIGS. 6A and 6B are flowcharts of general operations of the load balancing apparatus as shown in FIG. 1.
Figure 6A:
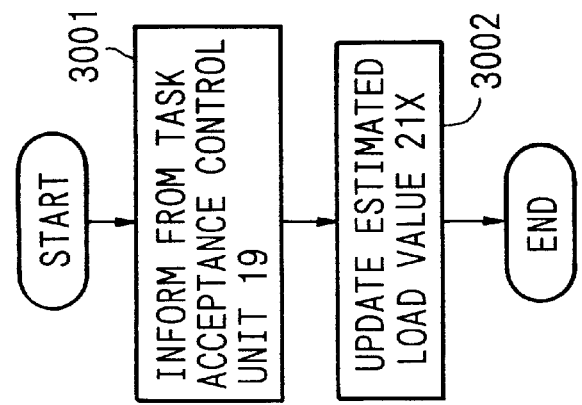

FIGS. 6A and 6B are flowcharts of general operations of load balancing apparatus 10A as shown in FIG. 1.

Load estimating unit 16 (for estimating the load of the present node) is activated when the estimating unit is informed by task acceptance control unit 19 that the control unit handed over a task of a self-executable function X (which means a function which the present node can execute) to task processing unit 20 or that the control unit received a result of the self-executable function X from task processing unit 20 (see step 3001). The activated load estimating unit 16 updates (or changes) an estimated load value (indicated by reference numeral "21X", hereinafter) of self-executable function X (see step 3002).

On the other hand, task acceptance control unit 19 judges whether or not a task belonging to the self-executable function X has been input from logical ring network 60B to task acceptance control unit 19 (see step 3003). If no task has been input, the task acceptance control unit 19 further judges whether or not a result has been input from task processing unit 20 (see step 3004). If judged "yes", the task acceptance control unit 19 notifies load estimating unit 16 of the judgment (see step 3008). On the other hand, if a result has also not been input, the processing returns to step 3003.

If it was judged that a task has been input in step 3003, task acceptance control unit 19 reads out a (predetermined) threshold value relating to the self-executable function X (indicated by reference numeral "27X", hereinafter) from threshold value storage unit 30 (see step 3005), then compares the above estimated load value 21X with the threshold value 27X and judges whether the task can be accepted or not in accordance with the size comparison of both values (see step 3006). According to a result of the comparison, task acceptance control unit 19 hands over the task to task processing unit 20 (see step 3007), or inputs the task into logical ring network 60B without handing it over to task processing unit 20 (see step 3009). When task acceptance control unit 19 hands over a task to task processing unit 20 or receives a result from task processing unit 20, the control unit 19 notifies load estimating unit 16 of the event (see step 3008). An alternating long and short dash line in FIG. 1 shows the result from task acceptance control unit 19 and a task which has not been handed over to task processing unit 20.

In the operations described above, the task input control, the update of the estimated load value, and the comparison of the estimated load value and the threshold value are performed for each self-executable function X. However, depending on the form of an application system, each node may have a single estimated load value and a single threshold value (that is, not for each self-executable function) for observing and controlling all tasks, or both methods may be used together in a system.

General Operations of Load Balancing Apparatus 10B

FIGS. 7A and 7B are flowcharts of general operations of load balancing apparatus 10B as shown in FIG. 2.

Load estimating unit 16 (for estimating the load of the present node) is activated when the estimating unit is informed by task acceptance control unit 19 that the control unit handed over a task of self-executable function X to task processing unit 20 or the control unit received a result of the self-executable function X from task processing unit 20 (see step 2001). The activated load estimating unit 16 updates an estimated load value 21X of self-executable function X (see step 2002).

On the other hand, task acceptance control unit 19 judges whether or not a task belonging to the self-executable function X has been input from logical ring network 60B to task acceptance control unit 19 (see step 2003). If no task has been input, the task acceptance control unit 19 further judges whether or not a result has been input from task processing unit 20 (see step 2004). If judged "yes", the task acceptance control unit 19 notifies load estimating unit 16 of the judgment (see step 2008). On the other hand, if a result has also not been input, the processing returns to step 2003.

If it was judged that a task has been input in step 2003, task acceptance control unit 19 notifies threshold value setting unit 40 of the judgment. The threshold value setting unit 40 estimates a load fluctuation of the entire system by monitoring tasks passing through the logical ring network 60B according to the notification from task acceptance control unit 19, and updates total threshold value 27 of the present node according to the estimated load fluctuation. The task acceptance control unit 19 also estimates a load fluctuation with respect to self-executable functions, and updates threshold value 27X for each self-executable function according to the estimated load fluctuation (see step 2005).

If an input task belongs to the function X, the task acceptance control unit 19 compares the above estimated load value 21X with the threshold value 27X, and judges whether the task can be accepted or not in accordance with the size comparison of both values (see step 2006). According to a result of the comparison, task acceptance control unit 19 hands over the task to task processing unit 20 (see step 2007), or inputs the task into logical ring network 60B without handing it over to task processing unit 20 (see step 2009). When task acceptance control unit 19 hands over a task to task processing unit 20 or receives a result from task processing unit 20, the control unit 9 notifies load estimating unit 16 of the event (see step 2008). An alternating long and short dash line in FIG. 2 shows the result from task acceptance control unit 19 and a task which has not been handed over to task processing unit 20.

When the load balancing apparatus operating as explained above is applied to a function non-uniform system in which the number and the kinds of executable tasks are different with respect to each node, the logical ring network is used as a common buffer for each node; the load relating to the self-executable function X of each node is estimated by the load estimating unit of the node; the threshold value of the entire system and the threshold value of self-executable function X are updated by the threshold value setting unit according to load fluctuation of the entire system and load fluctuation of the self-executable function; the estimated load value of self-executable function X and the threshold value of self-executable function X are compared by the task acceptance control unit; and task acceptance control is performed in accordance with the size comparison of both values. Therefore:

(1) Assignment of (i) tasks belonging to functions which many nodes in the system and (ii) tasks belonging to functions which fewer nodes can execute is optimized by changing the number of tasks, which each node accepts, in accordance with (i) (for each function in the system,) the number of nodes which can execute the function and (ii) the load for each function. In this case, the response time with respect to a task belonging to a function which fewer nodes can execute does not become large; and (2) The total number of steps in executable programs of each node is balanced by changing the threshold value of each node for each function in accordance with the number of steps of an executable program and load fluctuation of a self-executable function. Therefore, the mean response time of the entire system is minimized.

General Operations of Load Balancing Apparatus 10C

Figure 8B:
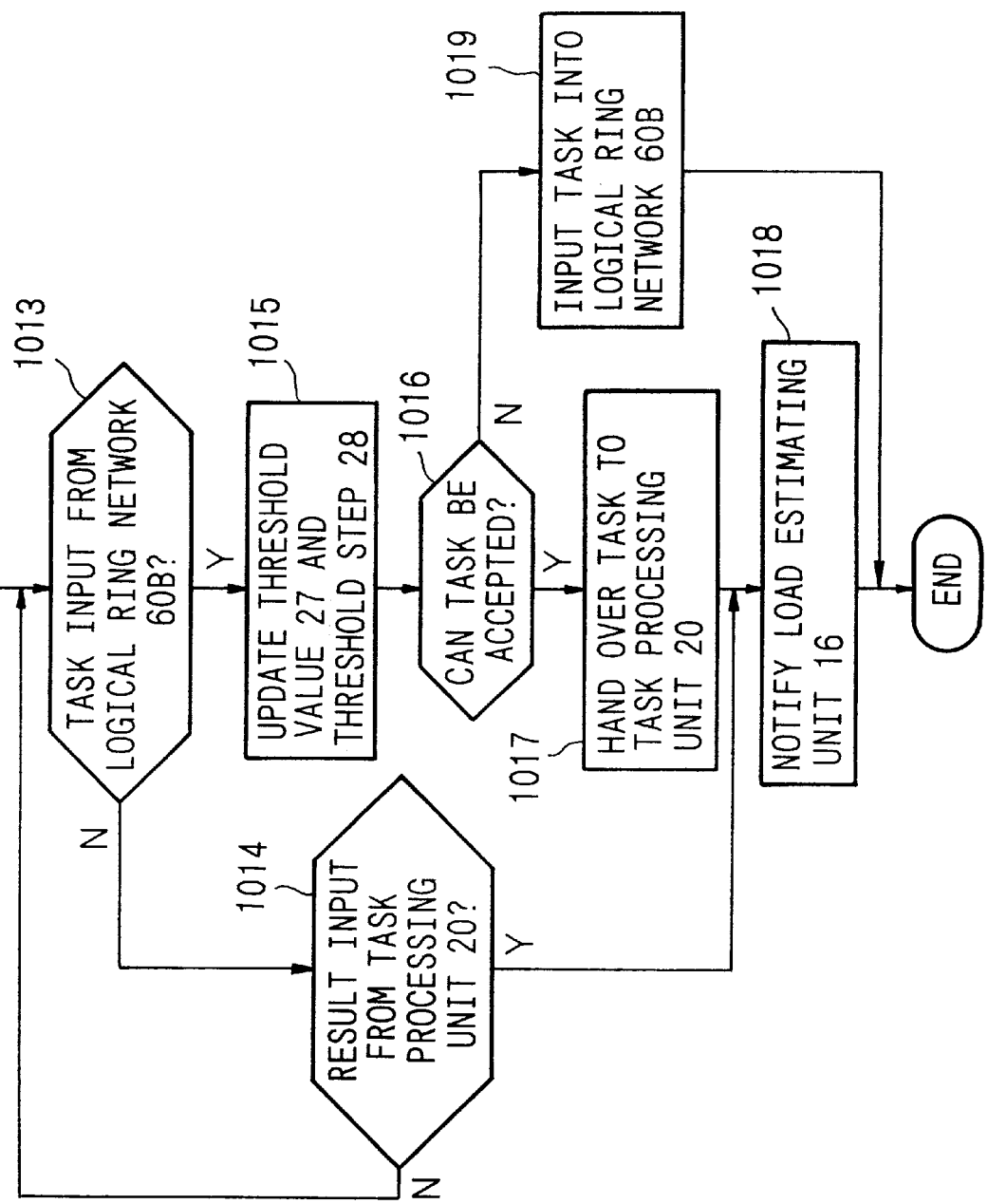
FIGS. 8A and 8B are flowcharts of general operations of the load balancing apparatus as shown in FIG. 3.
Figure 8A:
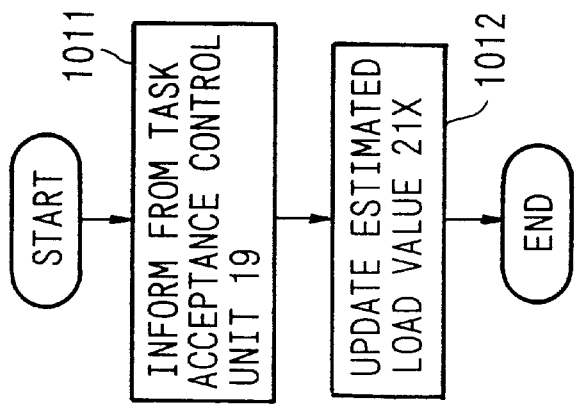

FIGS. 8A and 8B are flowcharts of general operations of load balancing apparatus 10C as shown in FIG. 3.

Load estimating unit 16 (for estimating the load of the present node) is activated when the estimating unit is informed by task acceptance control unit 19 that the control unit handed over a task to task processing unit 20 or the control unit received a result of processing of the task from task processing unit 20 (see step 1011). The activated load estimating unit 16 updates an estimated load value (indicated by reference numeral "21", hereinafter) of the node (see step 1012).

On the other hand, task acceptance control unit 19 judges whether or not a task has been input from logical ring network 60B to task acceptance control unit 19 (see step 1013). If no task has been input, the task acceptance control unit 19 further judges whether or not a result has been input from task processing unit 20 (see step 1014). If judged "yes", the task acceptance control unit 19 notifies load estimating unit 16 of the judgment (see step 1018). On the other hand, if a result has also not been input, the processing returns to step 1013.

If it was judged that a task has been input in step 1013, task acceptance control unit 19 notifies threshold value setting unit 40 of the judgment. The threshold value setting unit 40 estimates a load fluctuation of the entire system by monitoring tasks passing through the logical ring network 60B according to the notification from task acceptance control unit 19, and updates threshold value 27 of the present node. Threshold step setting unit 41 updates a threshold step (indicated by reference numeral "28", hereinafter) as a unit for changing the threshold value, by estimating performance of the entire system and performance of the present node at each time (see step 1015), or by receiving information relating to the performance of the entire system and the performance of the present node from an external unit.

The task acceptance control unit 19 compares the above estimated load value 21 with the threshold value 27, and judges whether the task can be accepted or not in accordance with the size comparison of both values (see step 1016). According to a result of the comparison, task acceptance control unit 19 hands over the task to task processing unit 20 (see step 1017), or inputs the task into logical ring network 60B without handing it over to task processing unit 20 (see step 1019). When task acceptance control unit 19 hands over a task to task processing unit 20 or receives a result from task processing unit 20, the control unit 9 notifies load estimating unit 16 of the event (see step 1018). An alternating long and short dash line in FIG. 3 shows the result from task acceptance control unit 19 and a task which has not been handed over to task processing unit 20.

When the load balancing apparatus operating as explained above is applied to a performance non-uniform system in which the performance with respect to each node is different, the logical ring network is used as a common buffer for each node; the load of each node is estimated by the load estimating unit of the node; the threshold value of the present node is updated by the threshold value setting unit according to load fluctuation of the entire system; the threshold step is set according to the performance of the entire system and the performance of the present node by the threshold step setting unit, and when the performance of the entire system is changed, the threshold value is updated according to the change; the estimated load value and the threshold value of the node are compared by the task acceptance control unit; and task acceptance control is performed in accordance with the size comparison of both values. Therefore:

(1) Task assignment according to the performance and load of each node is performed; thus, tasks are assigned to the nodes on the basis of performance levels in order from highest to lowest. Therefore, the response time of each task is minimized, and thus the mean response time of the entire system is minimized.

(2) Tasks are assigned to the nodes in the order of performance levels thereof regardless of the arrangement order of the nodes; thus, it is possible to make full use of high-performance nodes.

In the operations described above, the control (not for each function) using a single estimated load value and a single threshold value of the present node is performed. However, depending on the form of an application system, the task input control, the updating of the estimated load value, and the comparison of the estimated load value and the threshold value may be performed for each self-executable function X, or both methods may be used together in a system.

Figure 9A:
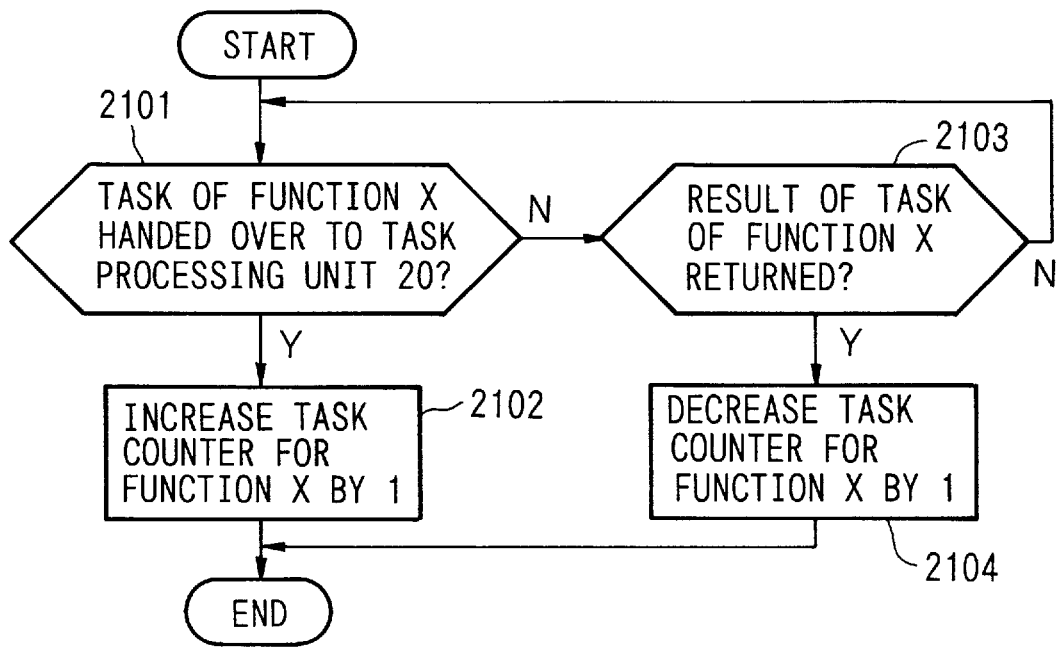
FIGS. 9A and 9B are flowcharts of the operational example 1 of the load estimating unit.

Next, plural operational examples of load estimating unit 16 will be explained. The following examples may be applied to any of the load balancing apparatuses 10A–10C.
Operational Example 1 of Load Estimating Unit FIG. 9A is a flowchart of the operational example 1 which uses a task counter.

When a task relating to function X is handed over from task acceptance control unit 19 to task processing unit 20, load estimating unit 16 (for the present node) increases a task counter for function X by "1" (see steps 2101 and 2102), while when a result of the task for function X is informed from task processing unit 20 to task acceptance control unit 19, load estimating unit 16 decreases the task counter by "1" (see steps 2103 and 2104). The load estimating unit 16 then sets estimated load value 21X of self-executable function X to be the counter value as a result of the increasing or decreasing operation, and informs task acceptance control unit 19 of the set value.

Figure 9B:
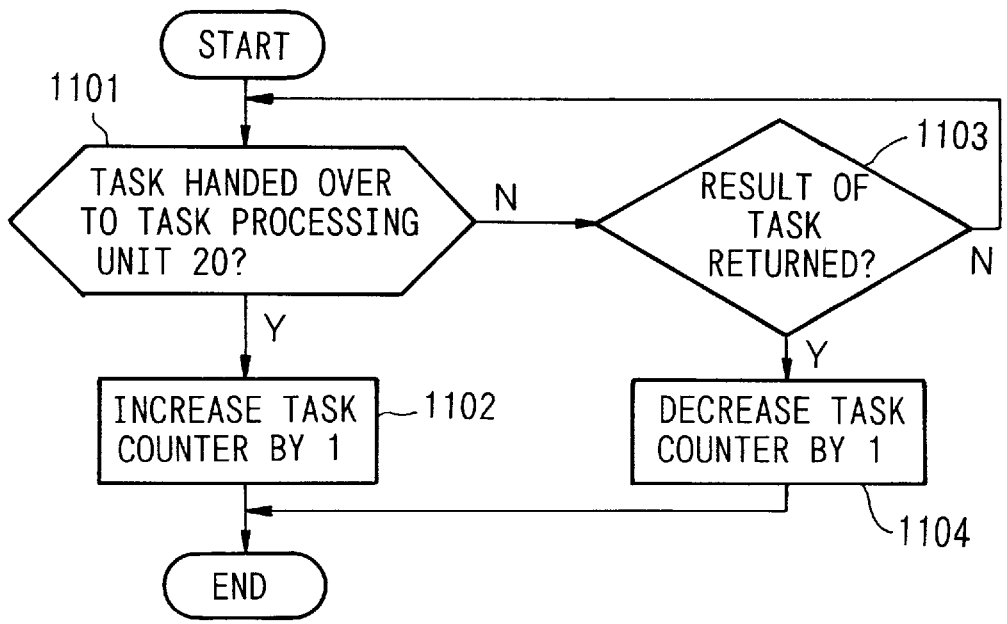
Figure 10A:
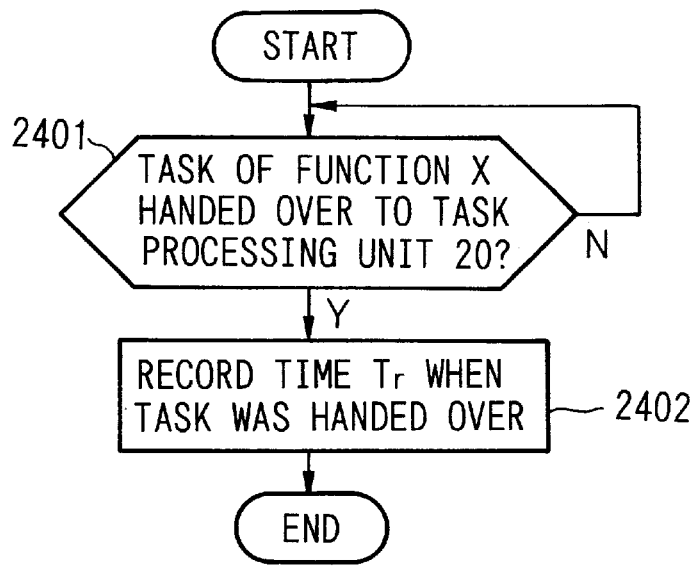
FIGS. 10A–10D are flowcharts of the operational example 2 of the load estimating unit.
Figure 10B:
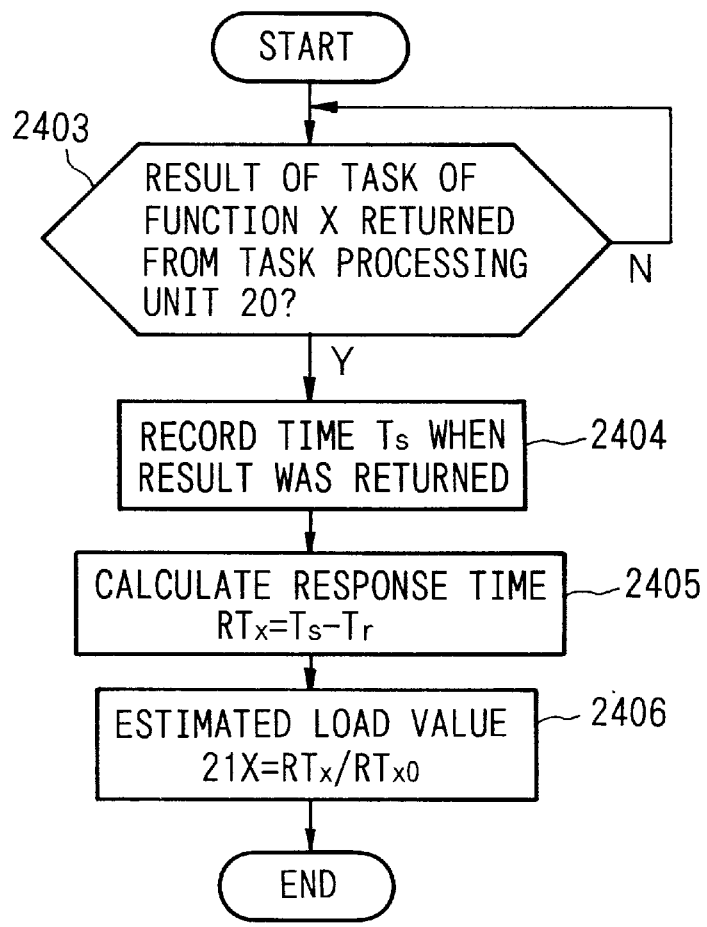

When estimated load value 21 (that is, not for each function) is set, similar operations are used and a flowchart for such a case is shown in FIG. 9B.
Operational Example 2 of Load Estimating Unit FIGS. 10A and 10B are flowcharts of the operational example 2 which uses a response time.

When a task of function X is handed over from task acceptance control unit 19 to task processing unit 20, load estimating unit 16 (for the present node) records the (present) time $T_r$ (see steps 2401 and 2402), while when a relevant result of the task for function X is informed from task processing unit 20 to task acceptance control unit 19, load estimating unit 16 records the (present) time $T_s$ (see steps 2403 and 2404). The load estimating unit 16 then calculates response time "$RT_x=T_s-T_r$" (see step 2405) and divides the response time $RT_x$ by response time $RT_{x0}$ which is used for such a case in which a task of self-executable function X is exclusively processed in a node which has no tasks in the waiting queue at that time. The fractions of the quotient are then rounded up so as to make an integer, and estimated load value 21X of self-executable function X is set to be this integer (see step 2406).

Figure 10C:
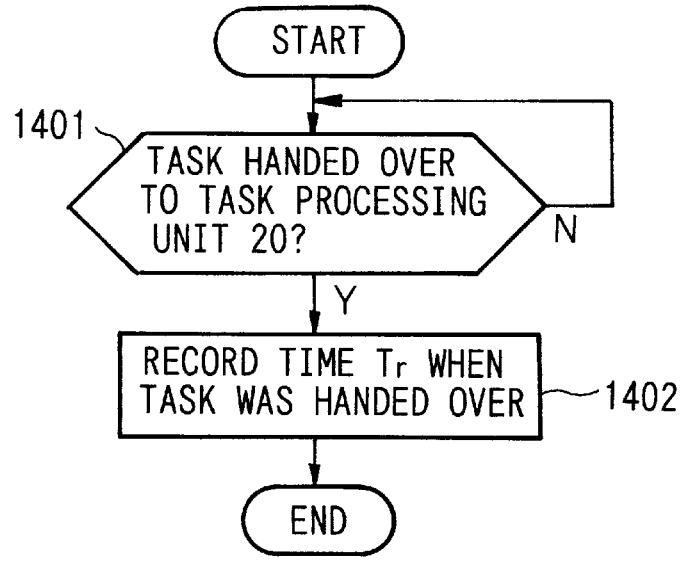
Figure 10D:
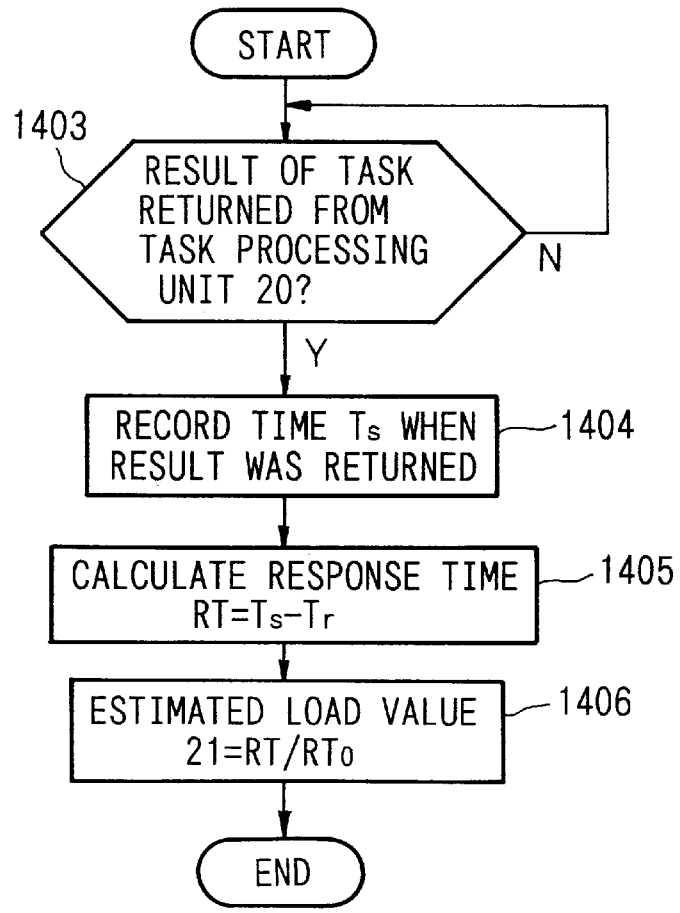
Figure 11A:
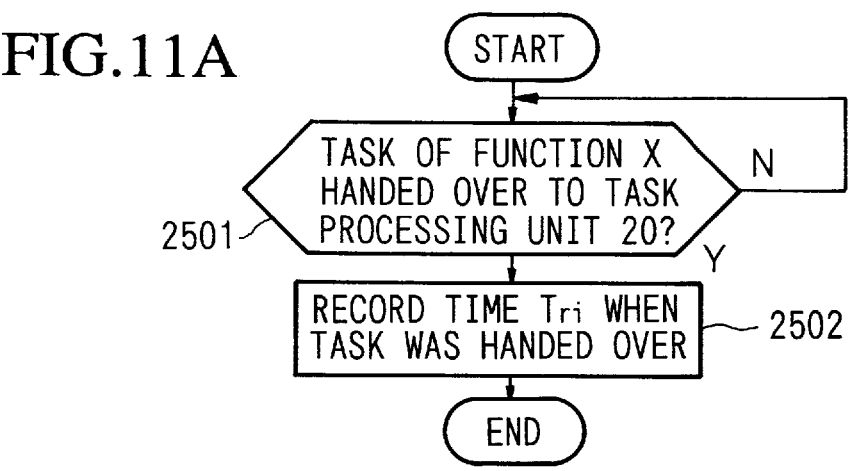
Figure 11B:
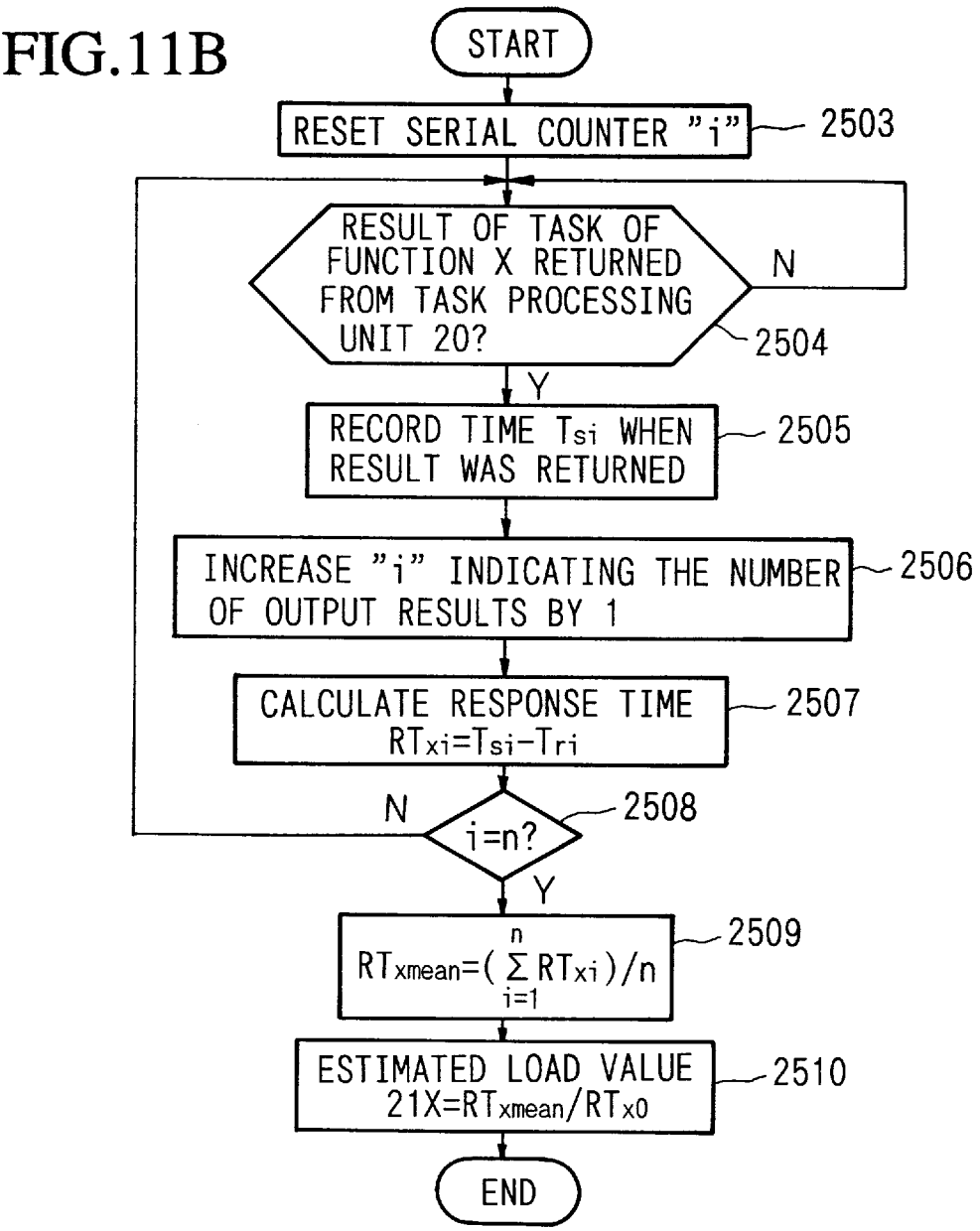

When estimated load value 21 (not for each function) is set, similar operations are used and a flowchart for such a case is shown in FIGS. 10C and 10D.
Operational Example 3 of Load Estimating Unit FIGS. 11A and 11B are flowcharts of the operational example 3 which uses an average of the response time.

Regarding n tasks (n being a fixed number) of self-executable function X, when each task is handed over from task acceptance control unit 19 to task processing unit 20, load estimating unit 16 (for the present node) records the (present) time $T_{ri}$ (i=1, 2, . . . , n) (see steps 2501 and 2502), while when a result of each task of function X is informed from task processing unit 20 to task acceptance control unit 19, load estimating unit 16 records the (present) time $T_{si}$. The load estimating unit 16 then measures each response time "$RT_{xi}=T_{si}-T_{ri}$" (i=1, 2, . . . , n) (see steps 2503–2508) and calculates an average of the response times (i.e., the mean response time) $RT_{xmean}$ by the following formula (see step 2509):

$$RT_{xmean}=(\Sigma RT_{xi})/n$$

This mean response time $RT_{xmean}$ is divided by response time $RT_{x0}$ used for such a case in that a task of self-executable function X is exclusively processed. The fractions of the quotient is then rounded up so as to make an integer, and estimated load value 21X of self-executable function X is set to be this integer (see step 2510).

Here, mean response time $RT_{xmean}$ may be calculated by measuring an entire response time $RT_{xi}$ with respect to tasks processed in a fixed time.

When estimated load value 21 (not for each function) is set, similar operations are used and a flowchart for such a case is shown in FIGS. 11C and 11D.

Next, plural operational examples of task acceptance control unit 19 will be explained. The following examples may also be applied to any of the load balancing apparatuses 10A–10C.

Operational Example 1 of Task Acceptance Control Unit

Figure 12A:
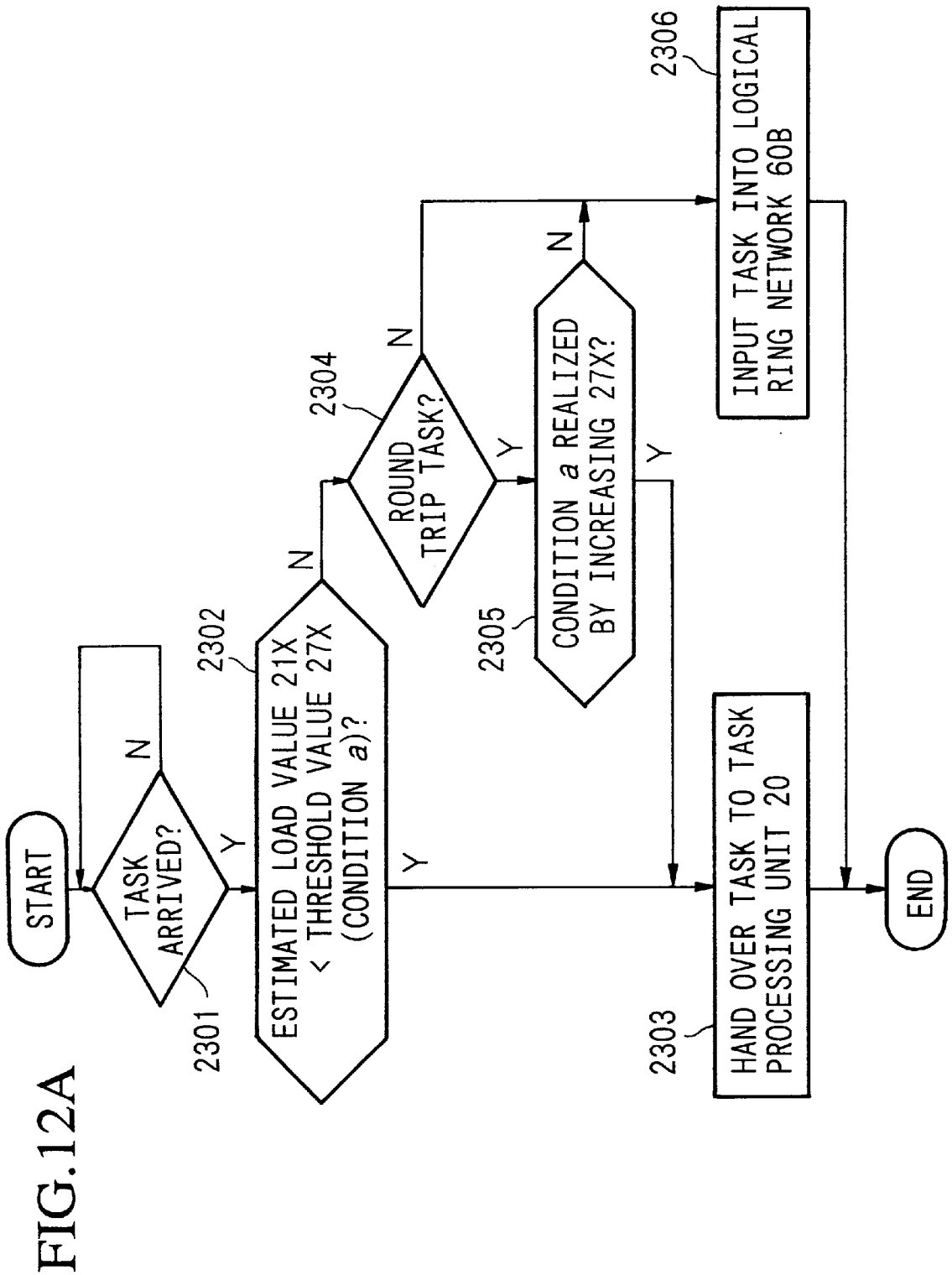

FIG. 12A is a flowchart of the operational example 1, which is an example using a result of comparison between estimated load value 21X and threshold value 27X of self-executable function X.

Task acceptance control unit 19 compares estimated load value 21X of self-executable function X with threshold value 27X of the function X for each arrival of a task relating to function X (see steps 2301 and 2302). If estimated load value 21X of self-executable function X is smaller than threshold value 27X of the function X, the task acceptance control unit 19 hands over the task to task processing unit 20 regardless of the kind of task (that is, in either the case of a round trip task or a normal task) (see step 2303). In the other cases, that is, if estimated load value 21X of self-executable function X is equal to or greater than threshold value 27X of the function X, the task acceptance control unit 19 hands over the task if the task is a round trip task and the condition "threshold value 27X>estimated load value 21X" would be realized by increasing the threshold value 27X (see steps 2304, 2305, and 2303). If the task is not a round trip task in step 2304, the task is input into logical ring network 60B (see step 2306).

When task acceptance control is performed by using a result of comparison between estimated load value 21 and threshold value 27 (that is, not for each function), similar operations are used and a flowchart for such a case is shown in FIG. 12B.

Operational Example 2 of Task Acceptance Control Unit

Figure 13A:
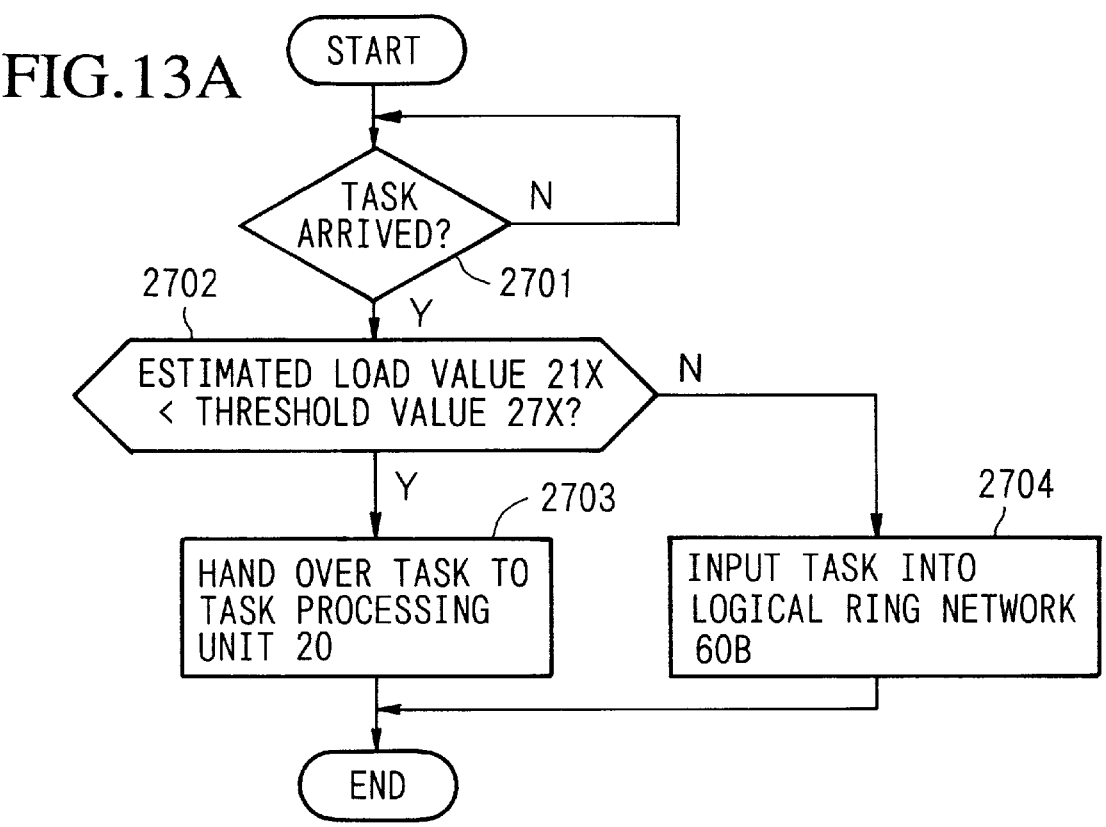
FIGS. 13A and 13B are flowcharts of the operational example 2 of the task acceptance control unit.

FIG. 13A is a flowchart of the operational example 2, which is another example using a result of comparison between estimated load value 21X and threshold value 27X of self-executable function X. Judgment performed in this example is simpler.

Task acceptance control unit 19 compares estimated load value 21X of self-executable function X with threshold value 27X of the function X for each arrival of a task relating to function X (see steps 2701 and 2702). If estimated load value 21X of self-executable function X is smaller than threshold value 27X of the function X, the task acceptance control unit 19 hands over the task to task processing unit 20 (see step 2703), while if estimated load value 21X of self-executable function X is equal to or greater than threshold value 27X of the function X, the task acceptance control unit 19 inputs the task into logical ring network 60B (see step 2704).

Figure 13B:
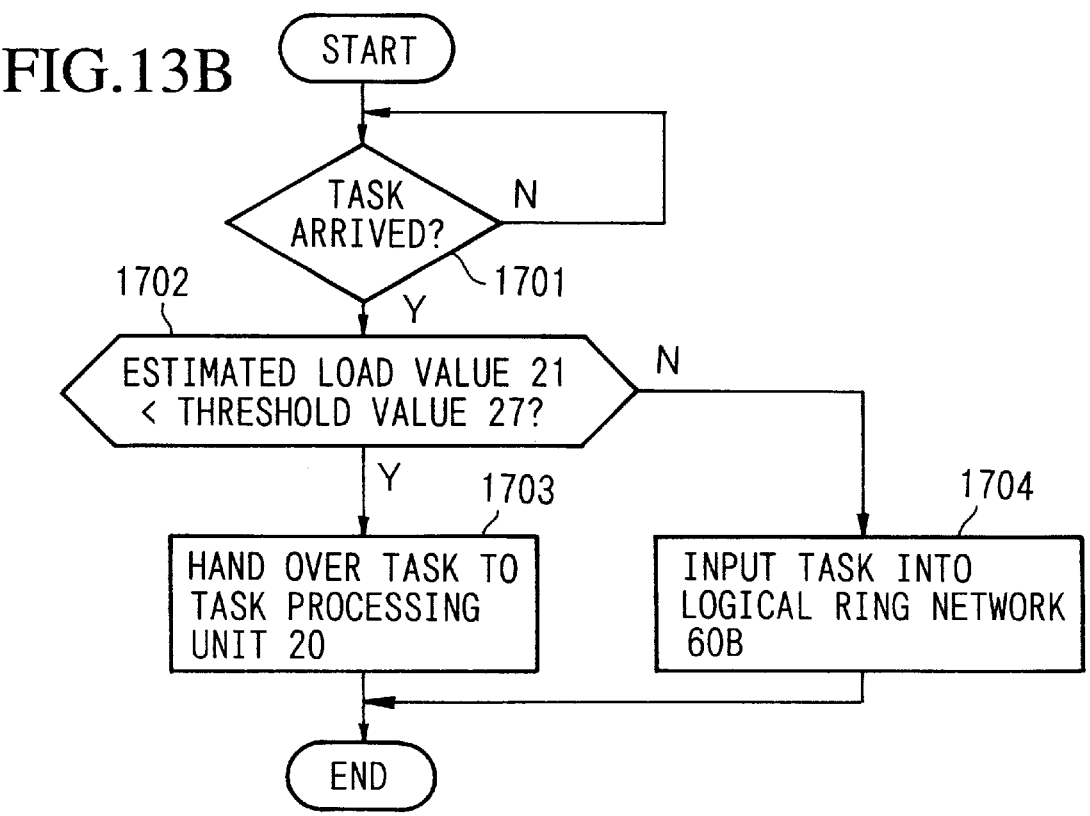

When task acceptance control is performed by using a result of comparison between estimated load value 21 and threshold value 27 (not for each function), similar operations are used and a flowchart for such a case is shown in FIG. 13B.

Operational Example 3 of Task Acceptance Control Unit

Figure 14A:
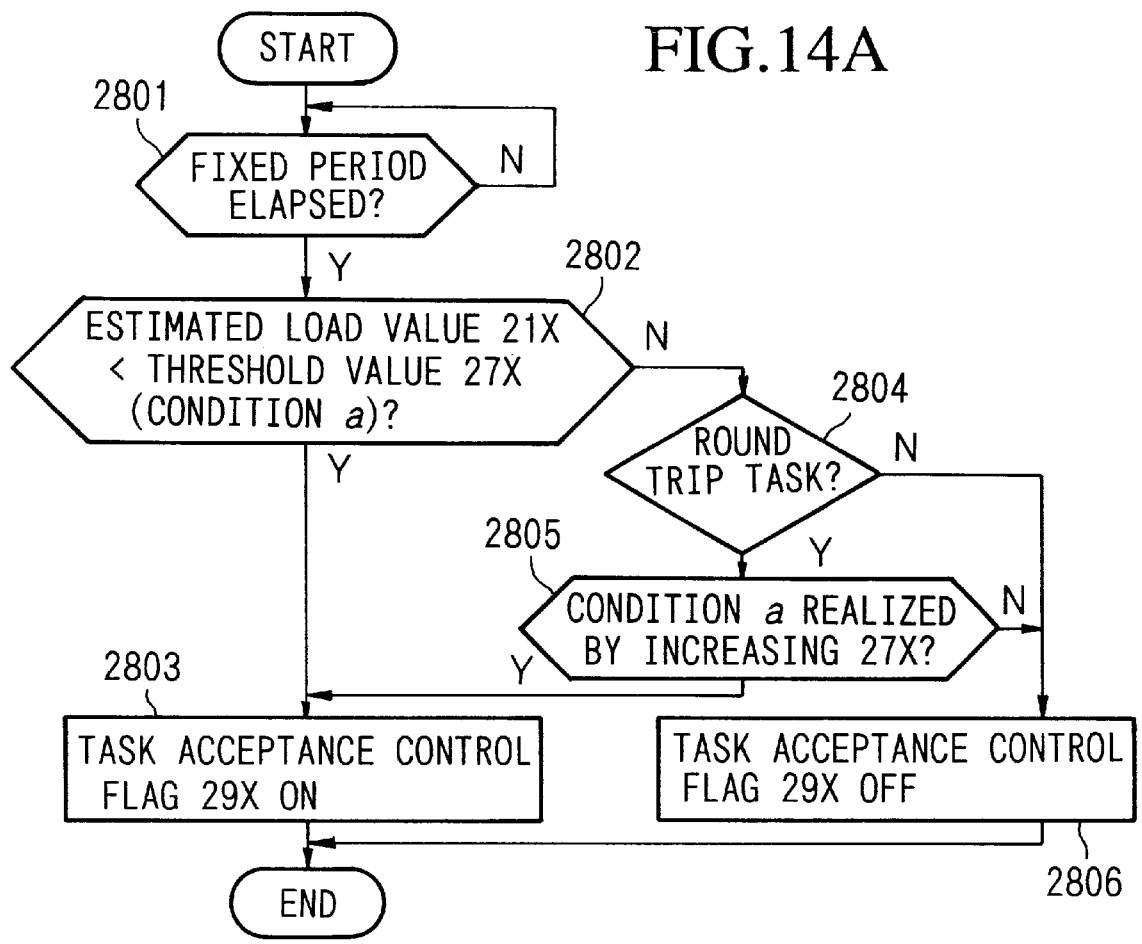
FIGS. 14A–14D are flowcharts of the operational example 3 of the task acceptance control unit.
Figure 14B:
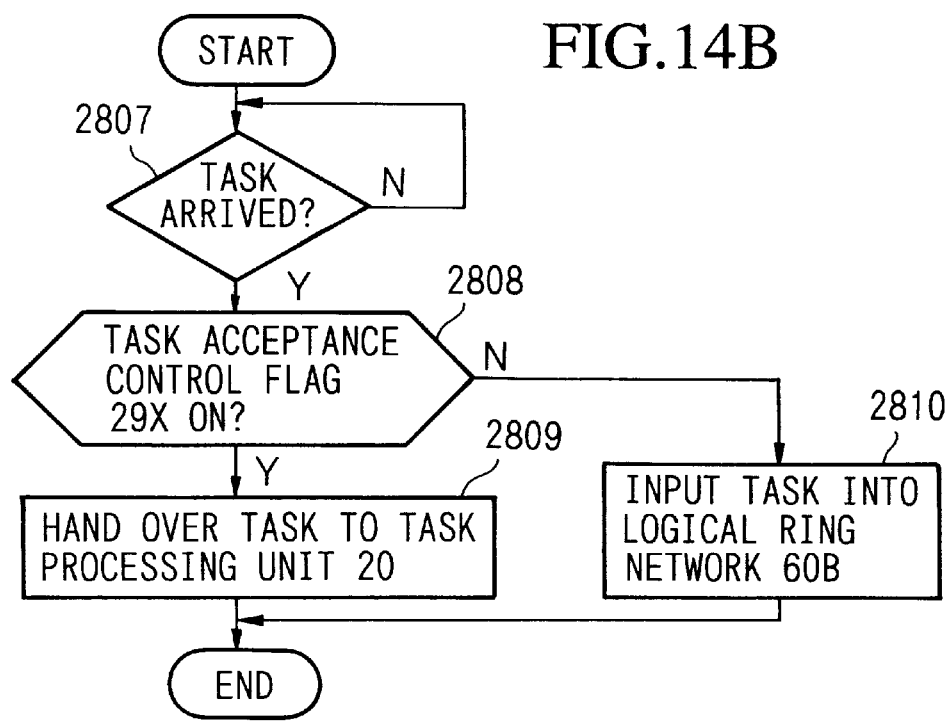

FIGS. 14A and 14B are flowcharts of the operational example 3, which is an example using a task acceptance control flag in addition to a result of comparison between estimated load value 21X and threshold value 27X of self-executable function X.

Task acceptance control unit 19 periodically compares estimated load value 21X of self-executable function X with threshold value 27X of the function X for each fixed period (see steps 2801 and 2802). If estimated load value 21X of self-executable function X is smaller than threshold value 27X of the function X, the task acceptance control unit 19 sets task acceptance control flag 29X to be in an "on" state (see step 2803). In the other cases, that is, if estimated load value 21X of self-executable function X is equal to or greater than threshold value 27X of the function X, the task acceptance control unit 19 sets the task acceptance control flag 29X to be in an "on" state if the task is a round trip task and the condition "threshold value 27X>estimated load value 21X" would be realized by increasing the threshold value 27X (see steps 2804, 2805, and 2803). If the task is not a round trip task in step 2804, the task acceptance control flag 29X is set to be in an "off" state (see steps 2804 and 2806).

When a task relating to function X arrives, the task acceptance control unit 19 examines the state of task acceptance control flag 29X (see steps 2807 and 2808), and if the flag is "on", the task is handed over to task processing unit 20 (see step 2809), while if the flag is "off", the task is input into logical ring network 60B (see step 2810).

Here, comparison in step 2802 may be performed with a change of threshold value 27X of self-executable function X for the present node or a change of estimated load value 21X (of self-executable function X) as a trigger.

Figure 14C:
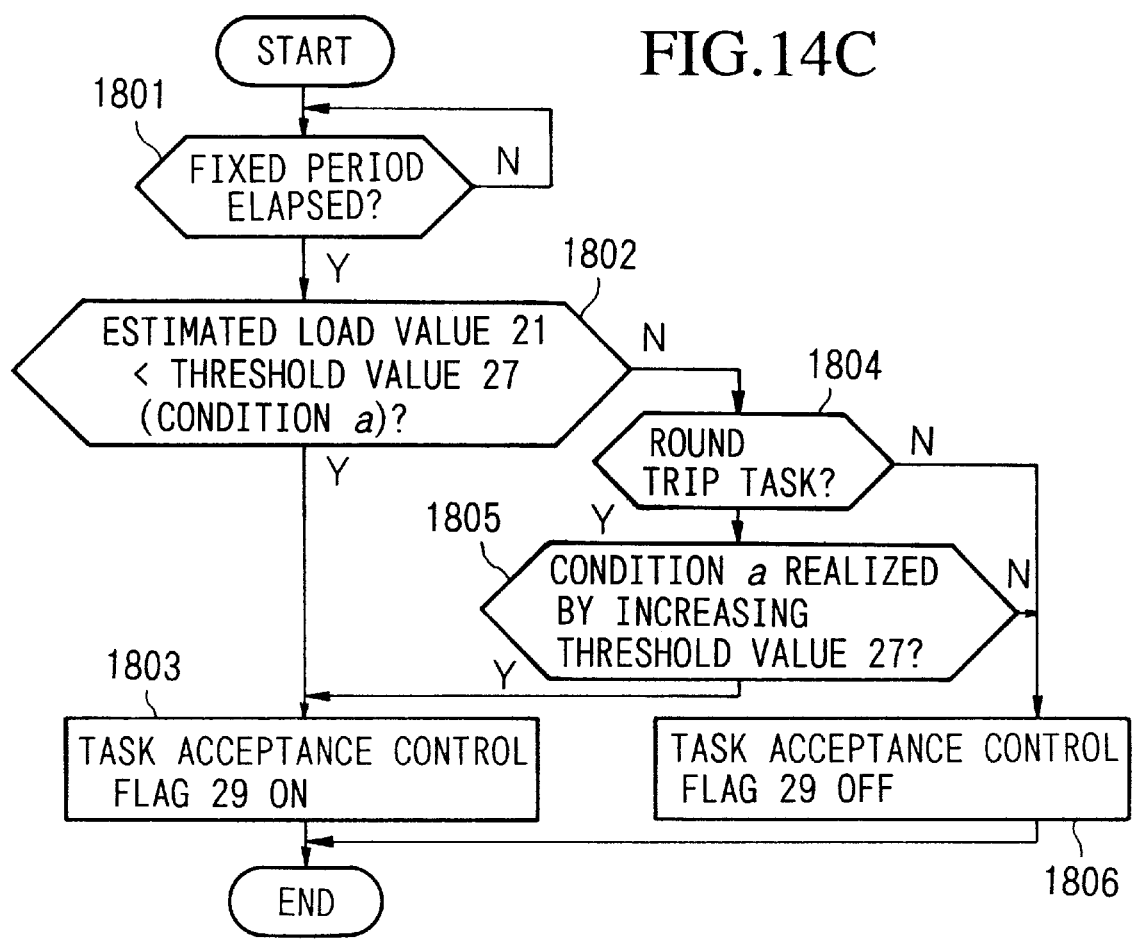
Figure 14D:
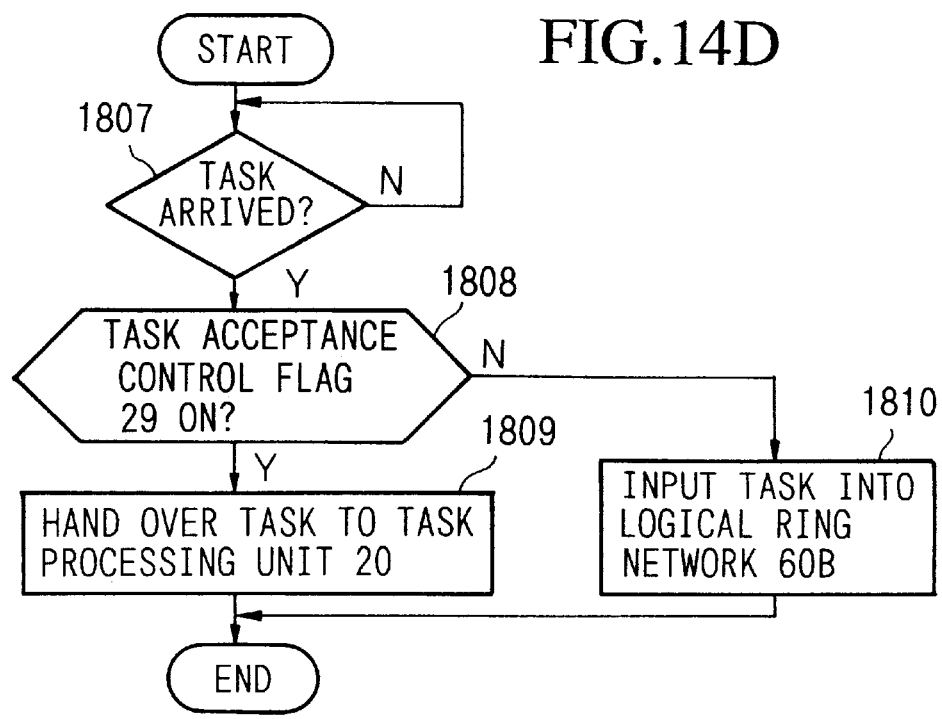

When task acceptance control is performed by using a result of comparison between estimated load value 21 and threshold value 27 and task acceptance control flag 29 (that is, not for each function), similar operations are used and a flowchart for such a case is shown in FIGS. 14C and 14D.

Operational Example 4 of Task Acceptance Control Unit

Figure 15A:
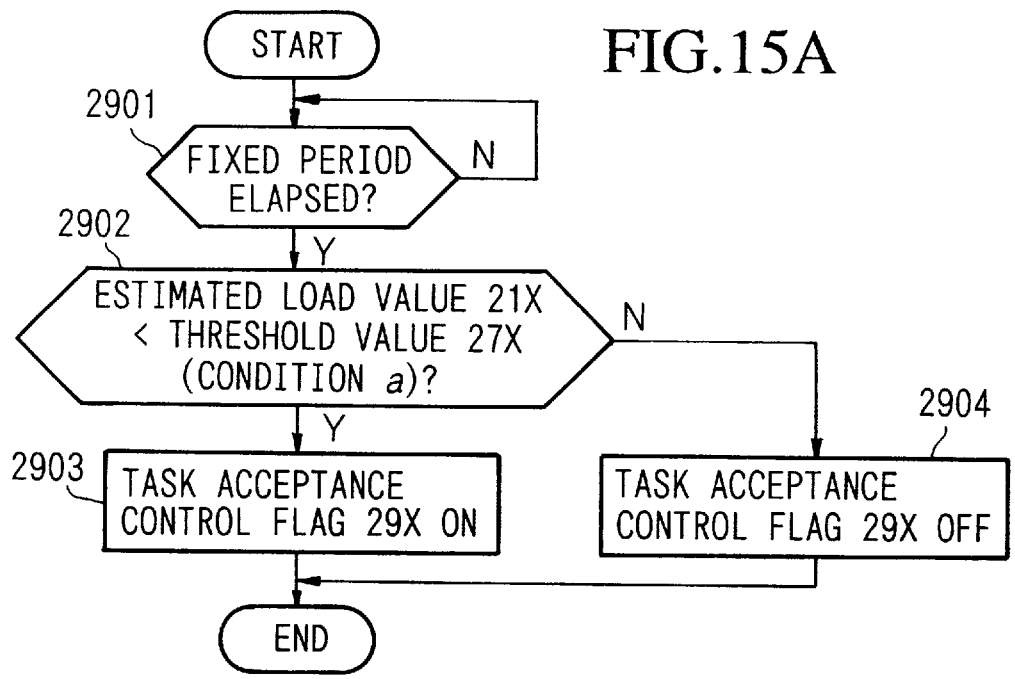
FIGS. 15A–15D are flowcharts of the operational example 4 of the task acceptance control unit.
Figure 15B:
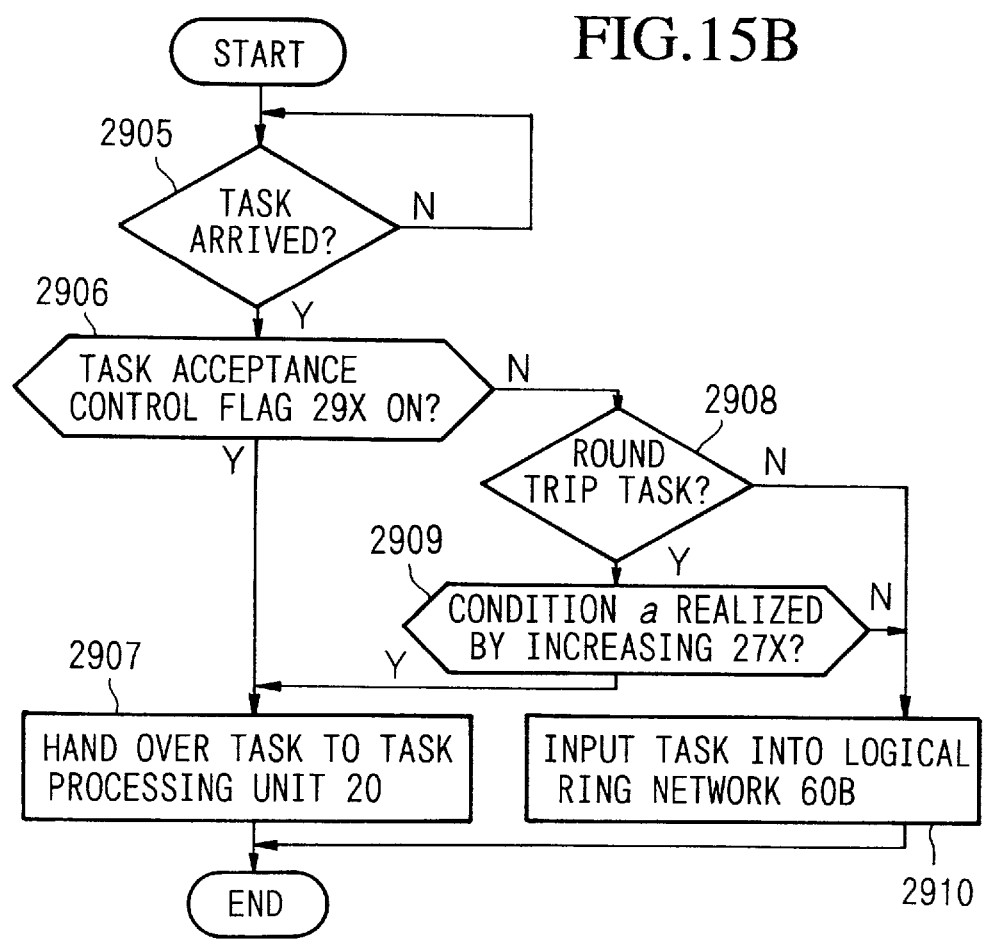

FIGS. 15A and 15B are flowcharts of the operational example 4, which is the second example using a task acceptance control flag.

Task acceptance control unit 19 periodically compares estimated load value 21X of self-executable function X with threshold value 27X of the function X for each fixed period (see steps 2901 and 2902). If estimated load value 21X is smaller than threshold value 27X of the function X, the task acceptance control unit 19 sets task acceptance control flag 29X to be in an "on" state (see step 2903). If estimated load value 21X is equal to or greater than threshold value 27X, the task acceptance control unit 19 sets the task acceptance control flag 29X to be in an "off" state (see step 2904).

When a task relating to function X arrives, the task acceptance control unit 19 examines the state of task acceptance control flag 29X (see steps 2905 and 2906), and if the flag is "on", the task is handed over to task processing unit 20 (see steps 2906 and 2907). If the flag is "off", the task is a round trip task, and the condition "threshold value 27X>estimated load value 21X" would be realized by increasing the threshold value 27X, then the task is also handed over to task processing unit 20 (see steps 2908, 2909 and 2907). On the other hand, if task acceptance control flag 29X is "off" and the task is not a round trip task, the task is input into logical ring network 60B (see step 2910).

Here, comparison in step 2902 may be performed with a change of threshold value 27X of self-executable function X for the present node or a change of estimated load value 21X (of self-executable function X) as a trigger.

Figure 15C:
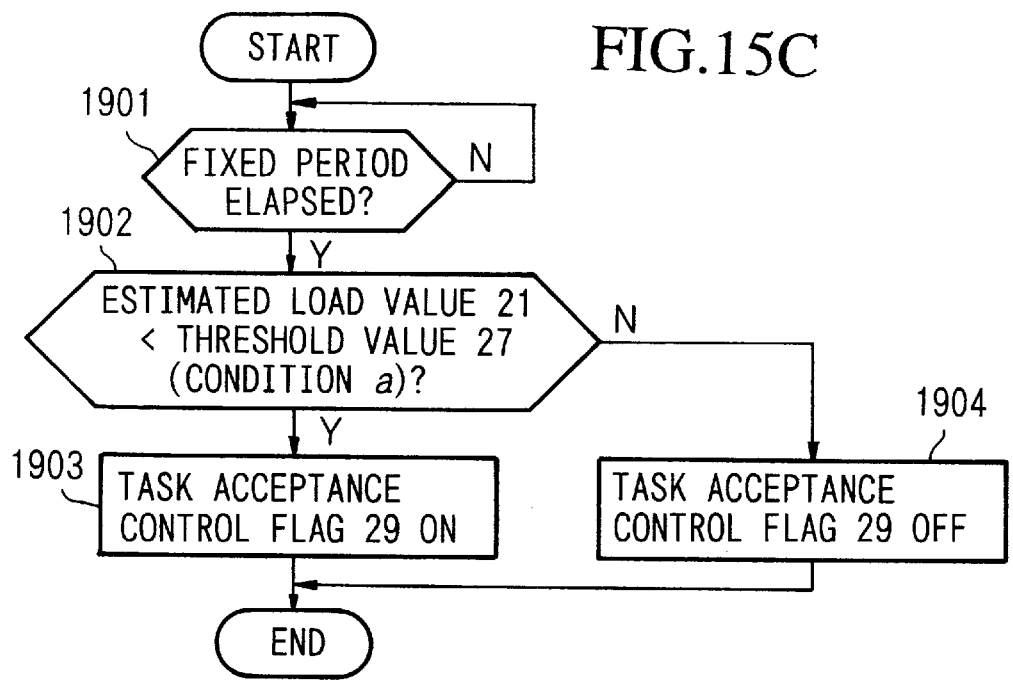
Figure 15D:
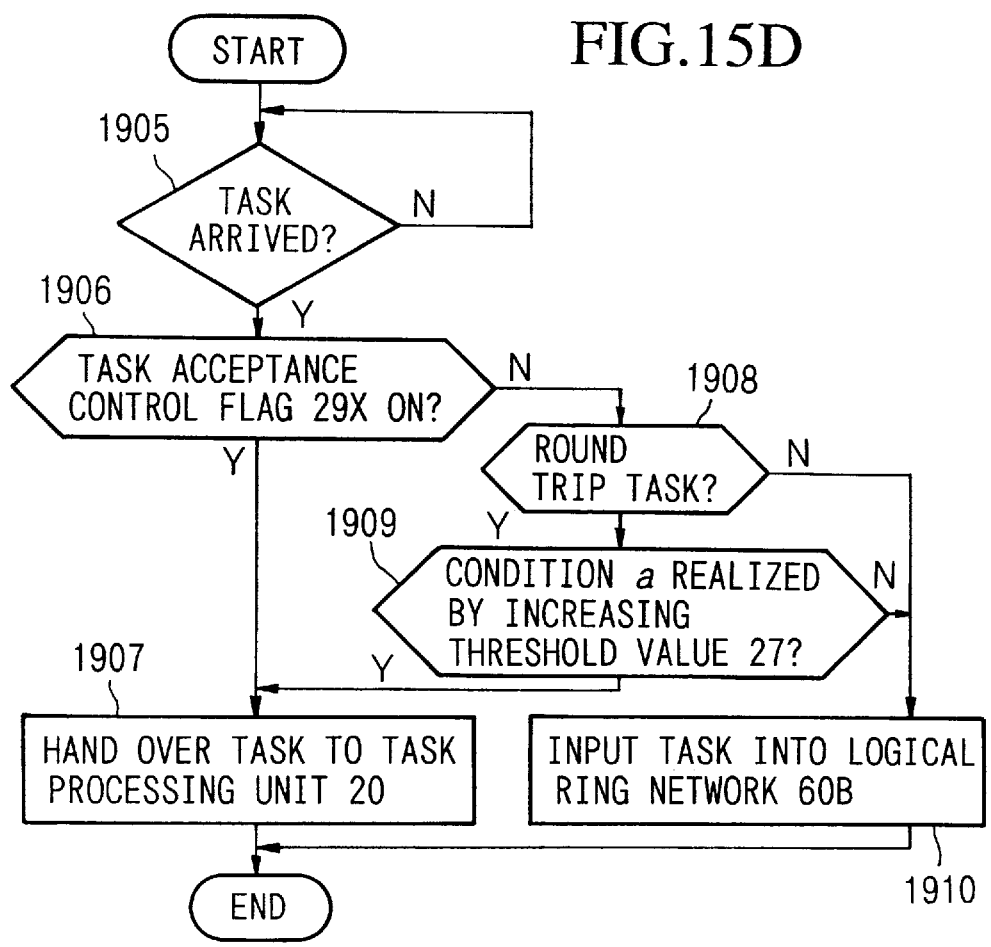

When task acceptance control is performed by using a result of comparison between estimated load value 21 and threshold value 27 and task acceptance control flag 29 (not for each function), similar operations are used and a flowchart for such a case is shown in FIGS. 15C and 15D.

Next, plural operational examples of threshold value setting unit 40 will be explained. The following examples may be applied to either of the load balancing apparatuses 10B and 10C.

Operational Example 1 of Threshold Value Setting Unit

Figure 16A:
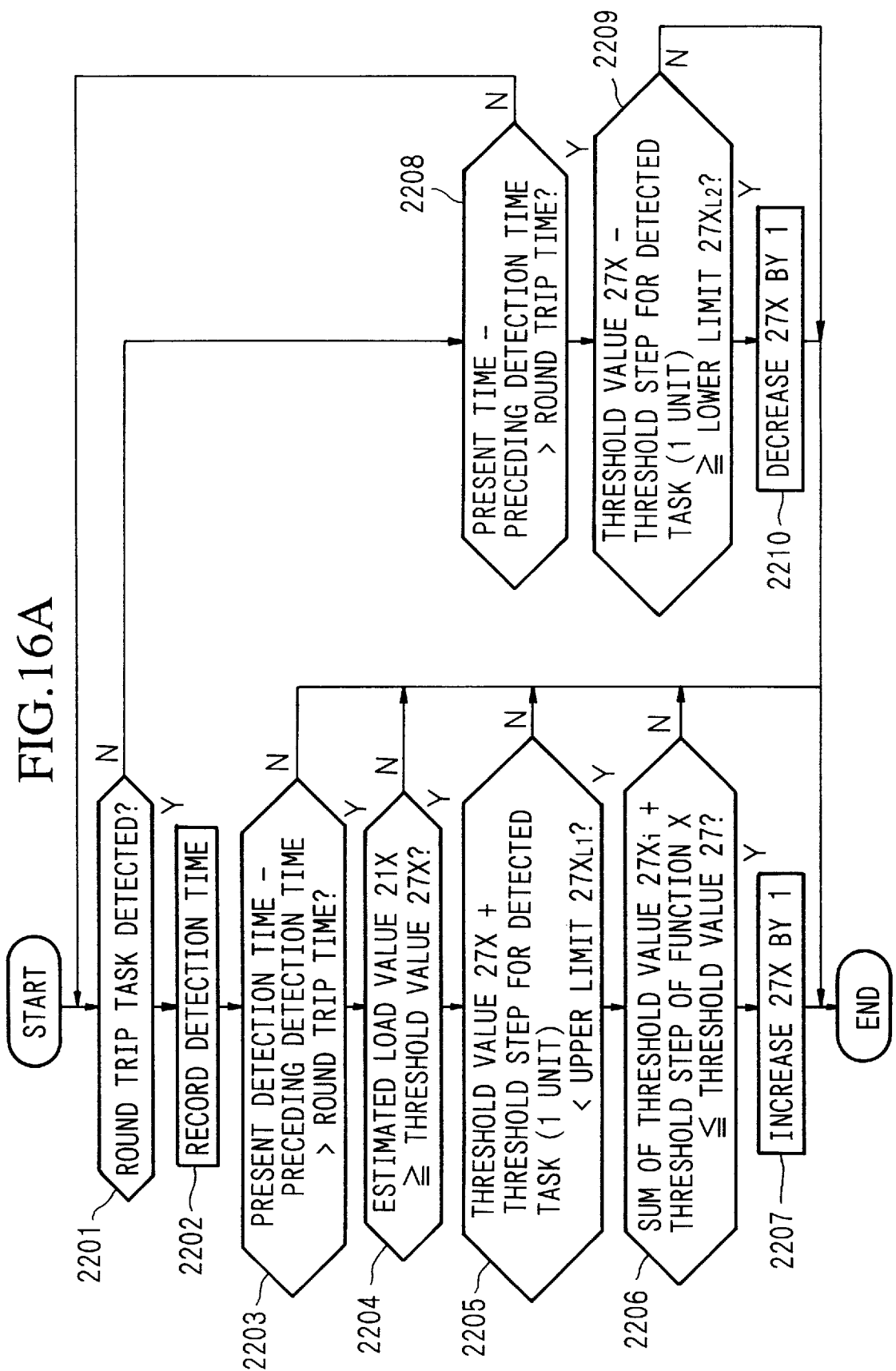
FIGS. 16A and 16B are flowcharts of the operational example 1 of the threshold value setting unit.

FIG. 16A is a flowchart of the operational example 1 of threshold value setting unit 40. In this example, the threshold value is updated when a round trip task is detected.

Threshold value setting unit 40 monitors, via task acceptance control unit 19, all tasks passing through logical ring network 60B. When the threshold value setting unit 40 detects a round trip task relating to a self-executable function X, the unit records the time of the detection (see steps 2201 and 2202).

Next, if:

(1) an amount obtained by subtracting the preceding detection time from the present detection time with respect to the round trip task is greater than a predetermined "round trip" time (see step 2203);

(2) estimated load value 21X of self-executable function X compared with threshold value 27X of the function X is equal to or greater than the threshold value 27X (see step 2204);

(3) a value obtained by adding a predetermined threshold step with respect to the function X (the threshold value will be called "1 unit" hereinafter, and the value of the "1 unit" is independently determined for each function) to the threshold value 27X is smaller than an upper limit threshold value $27X_{L1}$ which is predetermined with respect to the function X (see step 2205); and (4) the total value of (i) the sum of threshold values $27X_i$ of each self-executable function $X_i$ (i.e., the sum of threshold values $27X_1+27X_2+\ldots$) of the present node and (ii) the threshold step (value) of the above (specified) function X does not exceed the overall threshold value 27 of the present node (see step 2206); then the threshold value setting unit 40 increases threshold value 27X by "1 unit" (see step 2207).

While if a round trip task is not detected, if:

(1) the difference between the present time and the preceding detection time with respect to the round trip task is greater than the round trip time of the task; and (2) threshold value 27X would not be smaller than a lower limit threshold value $27X_{L2}$ (which is also predetermined with respect to the function X) even if the threshold value 27X is decreased by "1 unit", the threshold value setting unit 40 decreases threshold value 27X by "1 unit" (see steps 2208–2210).

Figure 16B:
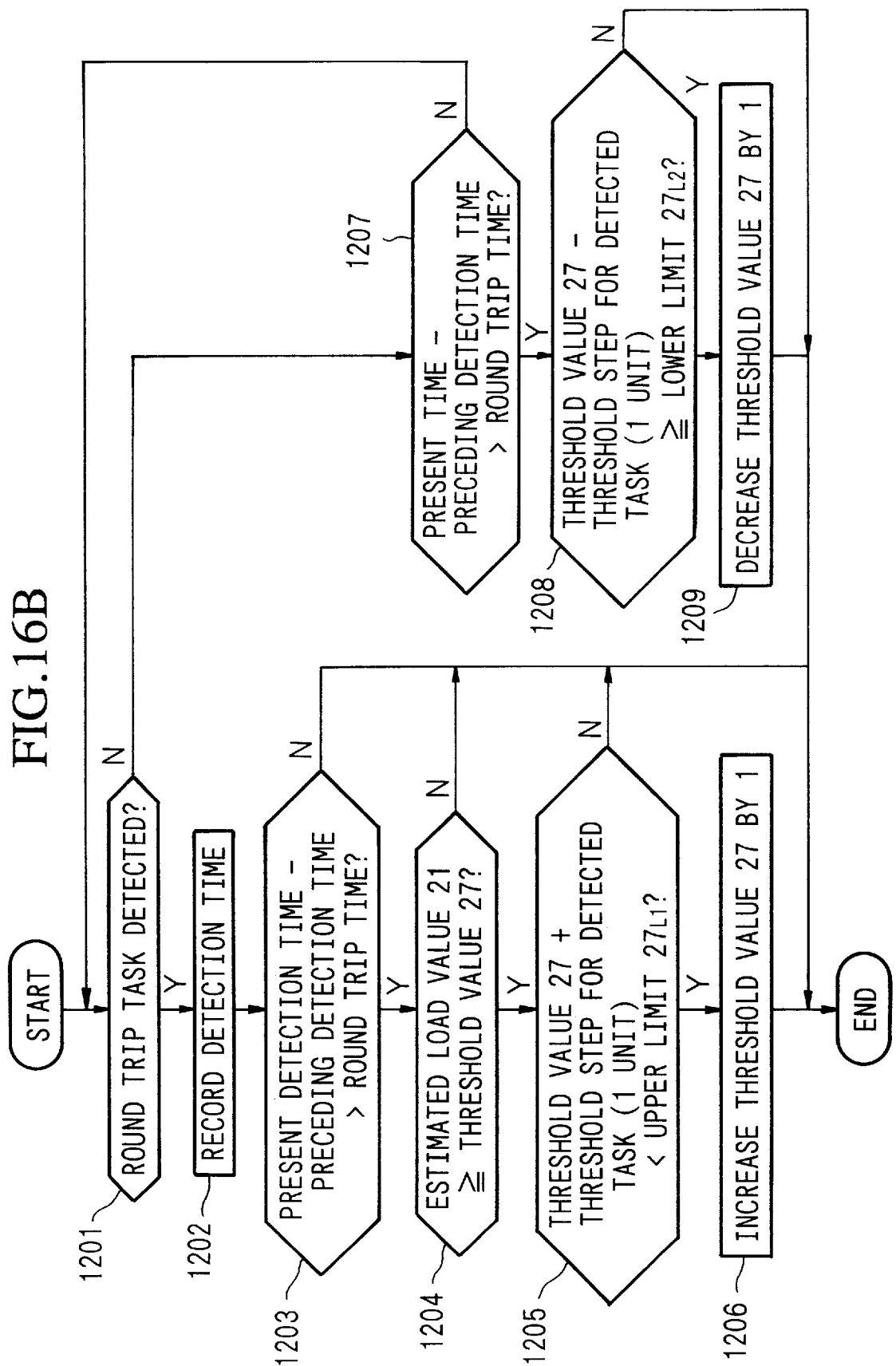

When the threshold value is updated by using a result of comparison between estimated load value 21 and threshold value 27 (that is, not for each function), similar operations are used but the process corresponding to the above step 2206 is unnecessary in this case. A flowchart for such a case is shown in FIG. 16B.

Operational Example 2 of Threshold Value Setting Unit

Figure 17:
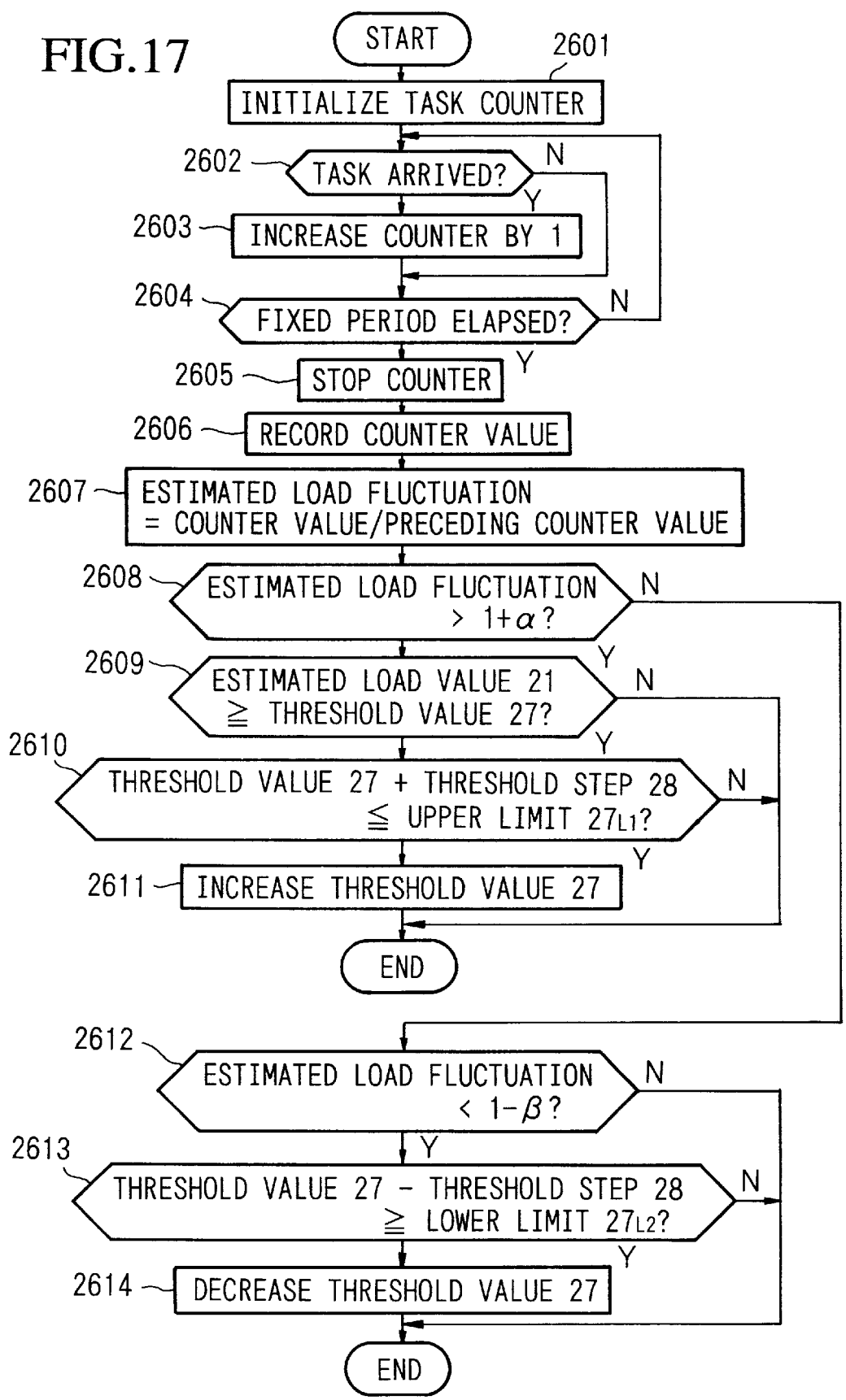
FIG. 17 is a flowchart of the operational example 2 of the threshold value setting unit.

FIG. 17 is a flowchart of the operational example 2 of threshold value setting unit 40. In this example, an estimated value for load fluctuation (i.e., estimated load fluctuation) is calculated.

Threshold value setting unit 40 counts, via task acceptance control unit 19, the number of all tasks which have passed through logical ring network 60B during a fixed measurement period (see steps 2601–2606) and calculates a ratio of the counted value to the preceding counted value (measured similarly) of all tasks which passed through the network during the preceding measurement period. An estimated value of load fluctuation of the entire system is determined as the ratio (see step 2607).

The threshold value setting unit 40 continues to monitor all tasks passing through logical ring network 60B and to calculate the estimated value of load fluctuation. In a case in which the estimated value of load fluctuation of the entire system has increased, if estimated load value 21 of the present node is equal to or greater than threshold value 27, the threshold value 27 is increased by a predetermined amount unless the threshold value 27 exceeds a predetermined upper limit $27_{L1}$ for the threshold value (see steps 2608–2611). In the opposite case in which the estimated value of load fluctuation of the entire system has decreased, the threshold value 27 is decreased by a predetermined amount unless the threshold value 27 falls below a predetermined lower limit $27_{L2}$ for the threshold value (see steps 2612–2614). Here, symbols $\alpha$ and $\beta$ indicate any reasonable values greater than 0 and smaller than 1.

In addition, if the estimated value of load fluctuation of the entire system is very small, no change of the overall threshold value 27 of the present node may be better. Therefore, the update of the threshold value is performed when the estimated value of load fluctuation is greater than a predetermined level.

Operational Example 3 of Threshold Value Setting Unit

Figure 18A:
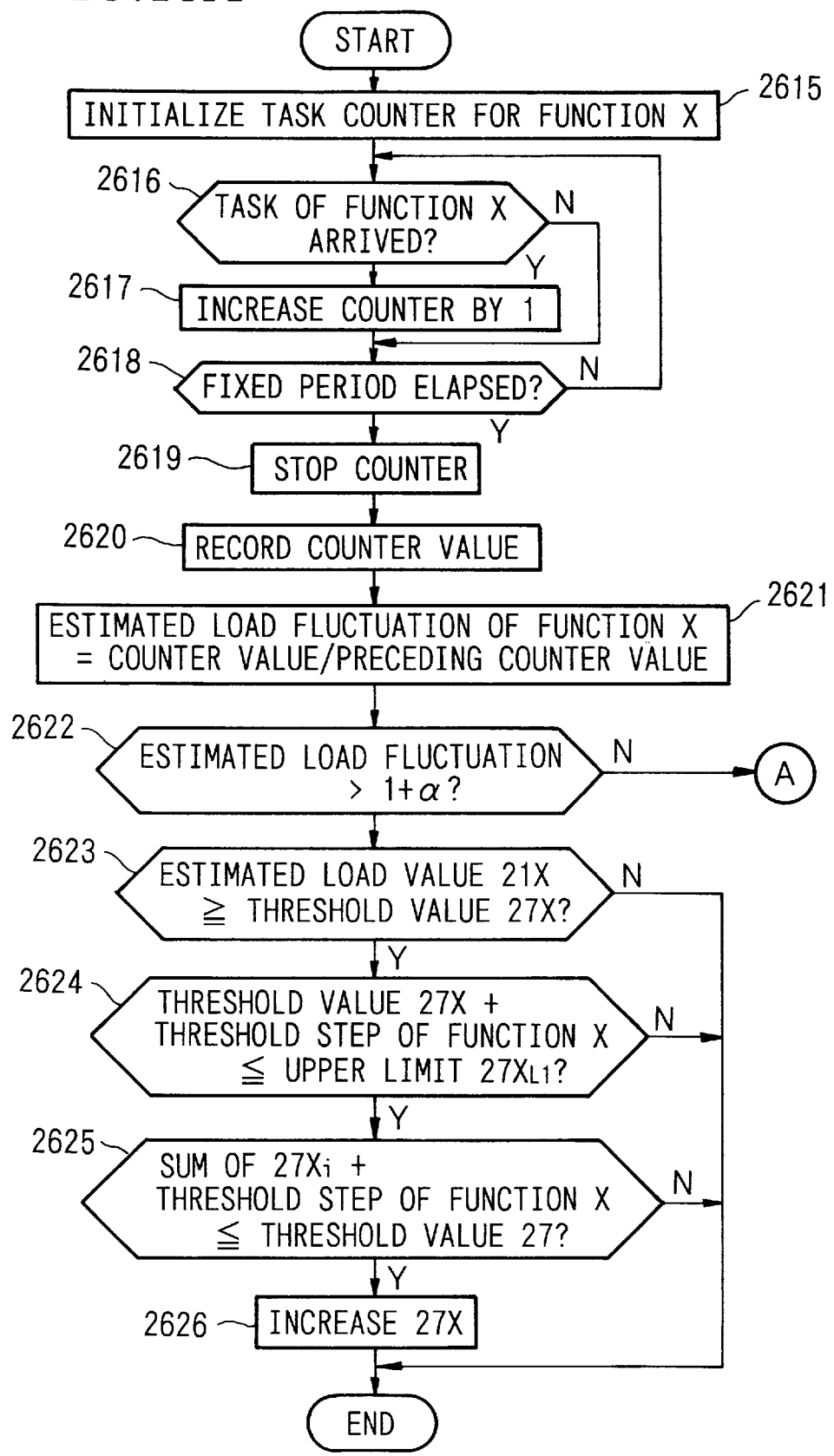
FIGS. 18A and 18B are flowcharts of the operational example 3 of the threshold value setting unit.
Figure 18B:
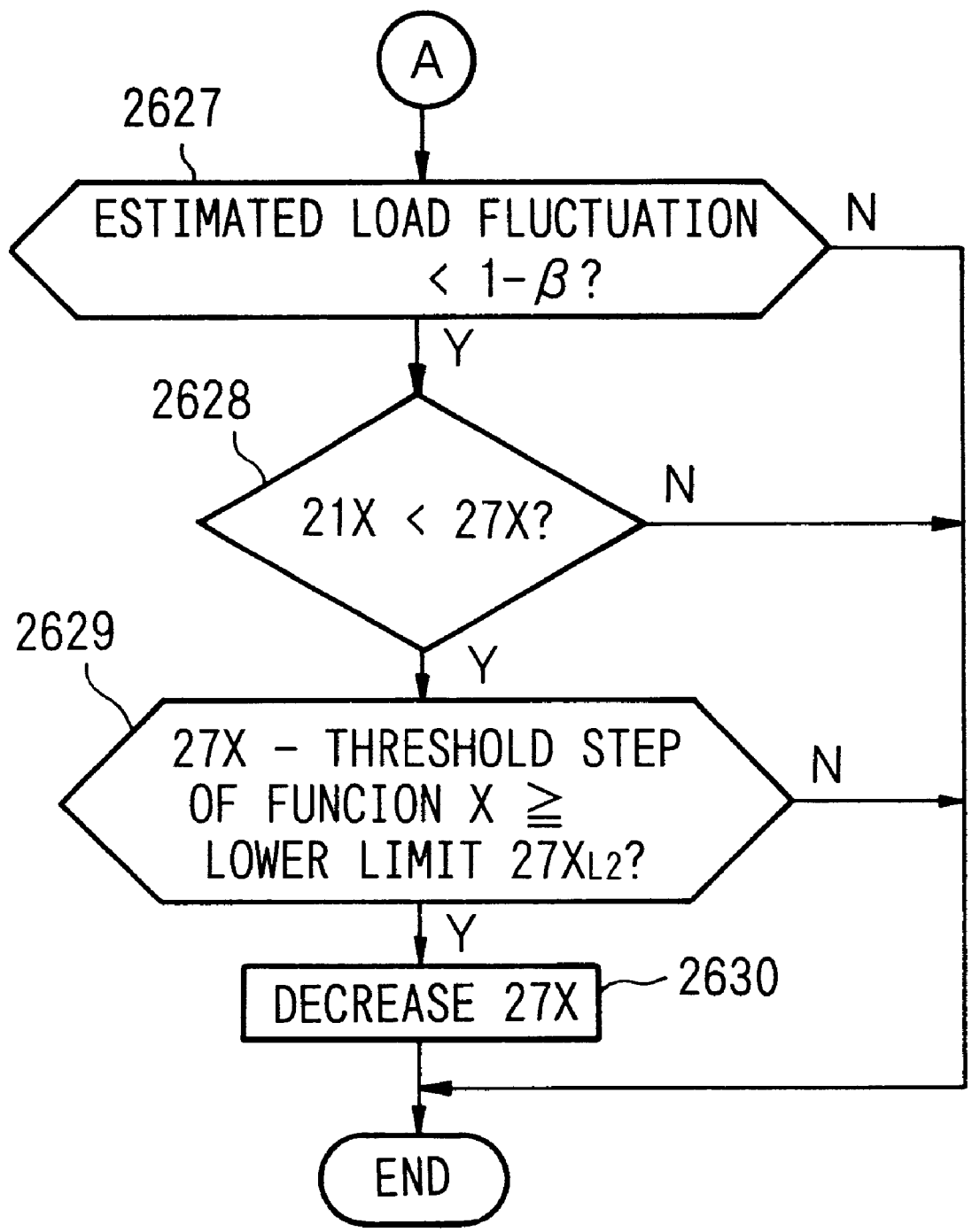

FIGS. 18A and 18B are flowcharts of the operational example 3 of threshold value setting unit 40. In this example, an estimated value for load fluctuation with respect to self-executable function X is calculated.

Threshold value setting unit 40 counts, via task acceptance control unit 19, the number of all tasks relating to function X, which have passed through logical ring network 60B during a fixed measurement period (see steps 2615–2620) and calculates a ratio of the counted value to the preceding counted value of passed tasks of function X during the preceding measurement period. An estimated value of load fluctuation of the function X is determined as the ratio (see step 2621).

The threshold value setting unit 40 continues to monitor all tasks relating to function X passing through logical ring network 60B and to calculate the estimated value of load fluctuation for each function.

(1) In a case in which the estimated value of load fluctuation of the function X is greater than 1, if:

(i) estimated load value 21X of self-executable function X is equal to or greater than threshold value 27X of the function X;

(ii) the updated threshold value 27X does not exceed upper limit $27X_{L1}$ of the threshold value 27X; and (iii) the total value of (i) the sum of threshold values $27X_i$ of each self-executable function $X_i$ (i.e., the sum of threshold values $27X_1+27X_2+\ldots$) of the present node and (iv) the threshold step (value) of the above (specified) function X does not exceed the overall threshold value 27 of the present node;

then threshold value 27X is increased according to the amount of the estimated value of load fluctuation of self-executable function X (see steps 2622–2626).

(2) In a case in which the estimated value of load fluctuation of the function X is smaller than 1, if:

(i) estimated load value 21X of self-executable function X is smaller than threshold value 27X of the function X; and (ii) the updated threshold value 27X is greater than or equal to lower limit $27X_{L2}$ of the threshold value 27X;

then threshold value 27X is decreased (see steps 2627–2630). Here, symbols α and β indicate any reasonable values greater than 0 and smaller than 1.

In addition, if the estimated value of load fluctuation of self-executable function X is very small, no change of the threshold value 27X of the function X may be better. Therefore, the update of the threshold value is performed when the estimated value of load fluctuation is greater than a predetermined level.

In load balancing apparatus 10C having threshold step setting unit 41, threshold step can be updated (or changed).

The threshold step setting unit 41 holds a value with respect to performance of the entire system (that is, the total performance of all nodes in the system) and a value with respect to performance of the present node, as known information, and sets an initial value of threshold step 28 to be a value obtained by dividing the value of the performance of the present node by the value of the performance of the entire system (normally, the initial value is provided from an external unit before the system operation is started). When a node is deleted from the system or a node is added to the system, the threshold step setting unit 41 updates the threshold step 28 based on a value with respect to performance of the node which has been deleted or added.

That is, the initial value of threshold step is set to be in an suitable value such as 0.1, 0.5, or 1. The threshold step setting unit 41 presumes that a node is deleted from the system or that a node is newly added to the system, based on a fluctuation manner of the flow rate of tasks passing through logical ring network 60B and a detection situation of round trip tasks, and updates threshold step 28 when deletion or addition of a node is presumed. Examples based on combinations of the fluctuation manner of the flow rate of tasks passing through logical ring network 60B (called "load fluctuation of the entire system") and the detection situation of the round trip task is shown in the list in FIG. 19.

Example of Arrangement of Centralized Management System

In the above-explained load balancing apparatuses 10B and 10C, threshold value setting unit 40 and threshold step setting unit 41 are provided for each node, that is, the units corresponding to the number of the nodes in the system are provided. However, threshold value setting unit 40C and threshold step setting unit 41C which perform centralized controls of updating the threshold value and the threshold step of each node may be provided. Exemplary arrangements of such a control are shown in FIGS. 20 and 21.

Figure 20:
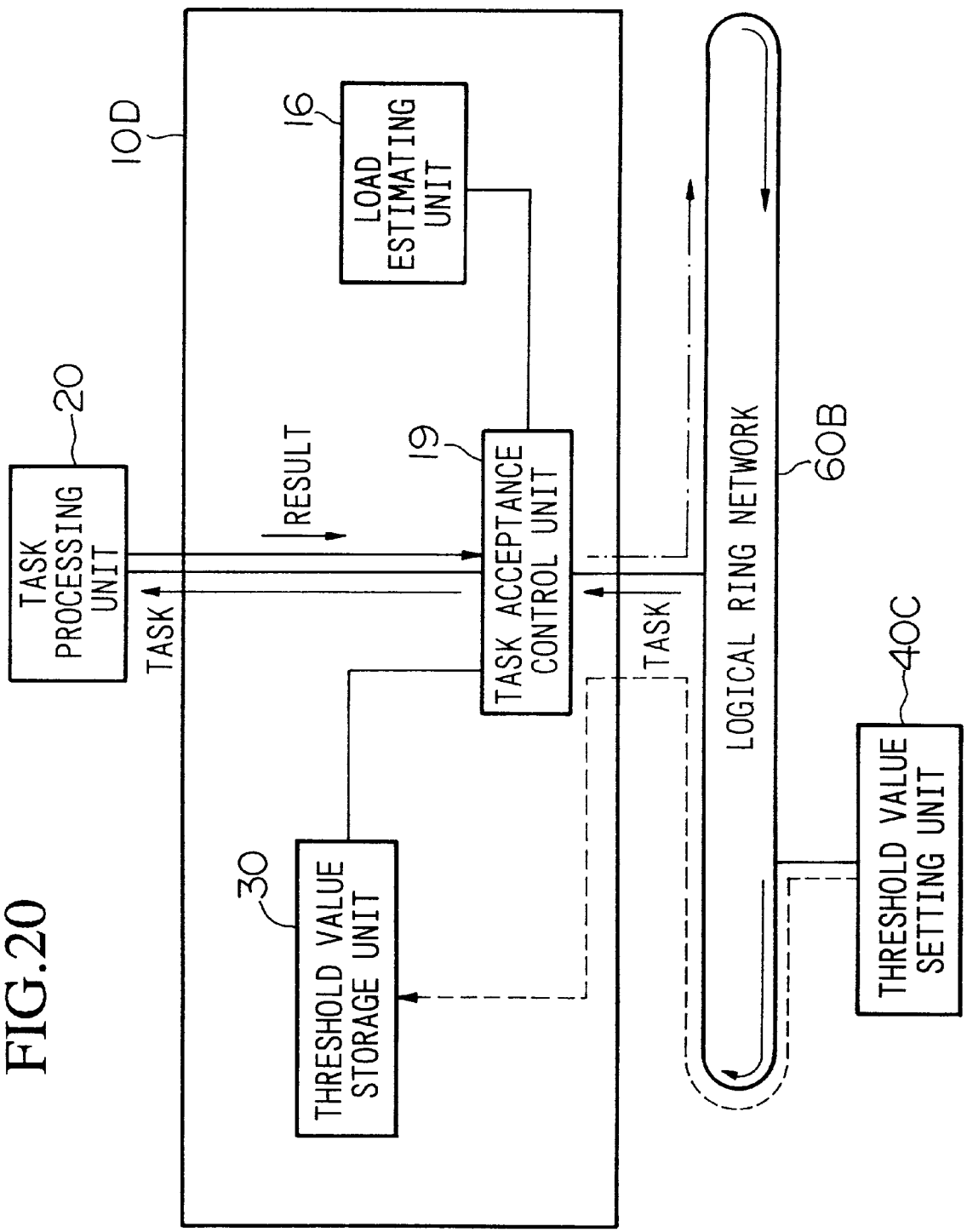
FIG. 20 is a block diagram showing an example of the centralized management system.

FIG. 20 shows an arrangement of a combination of load balancing apparatus 10D, which is an example of a centralized management system relating to load balancing apparatus 10B as shown in FIG. 2, and threshold value setting unit 40C. Here, threshold value setting unit 40C is provided in a node in the system or are independently provided, and performs threshold value setting processes of each node via logical ring network 60B and task acceptance control unit 19 of each node. The operations of the processes are similar to each relevant above-mentioned operation examples.

Figure 21:
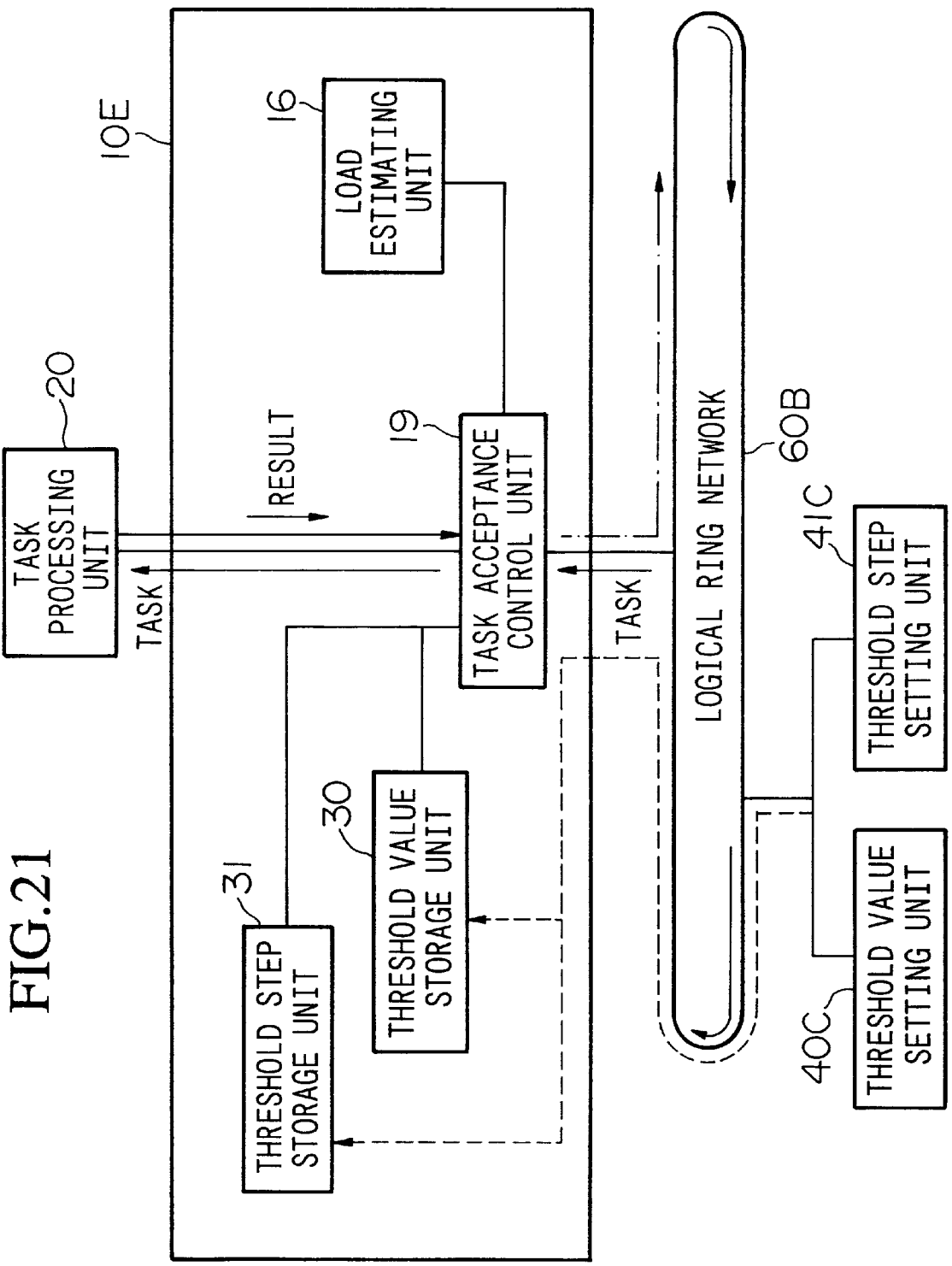
FIG. 21 is a block diagram showing another example of the centralized management system.

FIG. 21 shows an arrangement of a combination of load balancing apparatus 10E, which is an example of a centralized management system relating to load balancing apparatus 10C as shown in FIG. 3; and threshold value setting unit 40C; and threshold step setting unit 41C. Here, threshold value setting unit 40C and threshold step setting unit 41C are provided in a node in the system or are independently provided, and performs threshold value and threshold step setting processes of each node via logical ring network 60B and task acceptance control unit 19 of each node. The operations of the processes are similar to each relevant above-mentioned operation examples.

In each operational example explained, tasks are processed in turn from one which is earlier handed over to task processing unit 20, and results of processing are output in the same order of processing of the tasks, where one result for each task is returned. However, in another case in which results are output in another order different from the order of inputting tasks, the system can easily be operated by establishing correspondence between tasks and their results using identifiers and the like.

In yet another case in which plural results are returned for one task, the system can easily be operated by identifying the last result.

In addition, when load balancing apparatus is separately provided outside each node, as shown in FIG. 4, load balancing processing can be performed without imposing an extra burden on (computer) processing in each node; thus, the mean response time can much further be shortened, even at high load levels, in comparison with conventional systems. Furthermore, by making an LSI of the load balancing apparatus for making the apparatus independently operate, greater high-speed processing and contraction of the mean response time are realized.

What is claimed is:

1. A load balancing method for a computer system in which plural processing nodes, whose performance or executable functions are not uniform, are connected to a logical ring network, wherein when each node processes a task input from a terminal using a task processing unit and returns a result to the terminal, the logical ring network logically transmits tasks in turn and in one direction, said load balancing method equally distributing loads of the entire system into the nodes in the system and comprising the steps of:

estimating a load of a present node based on the number of tasks being or waiting to be processed and determining an estimated load value of the present node for each self-executable function of the node;

accepting a task passing through the logical ring network, and every time a task is accepted, comparing the estimated load value and a threshold value, which is set with respect to the number of tasks existing in the node, to limit the load of the present node based on the performance or self-executable functions of the present node;

judging, based on a result of the comparison, whether the accepted task is handed over to the task processing unit, or is transmitted to the logical ring network without handing over the task to the task processing unit;

estimating load fluctuation of the entire system; and updating the threshold value according to the estimated load fluctuation of the entire system and the estimated value of each self-executable function of the present node.

2. A load balancing method as claimed in claim 1, further comprising the step of updating a threshold step as an amount for changing the threshold value.

3. A load balancing method as claimed in claim 2, wherein when organization of the nodes in the computer system is modified by deleting or adding a node, the threshold step is updated based on a value with respect to performance of the node added or deleted.

4. A load balancing method as claimed in claim 2, wherein the step of updating the threshold step includes:

monitoring all tasks passing through the logical ring network;

estimating a load fluctuation of the entire system and a modification of organization of the nodes in the system in accordance with a change of the number of all passed tasks and with a change of the numbers of round trip tasks; and updating the threshold step based on a result of the load fluctuation estimate.

5. A load balancing method as claimed in claim 4, wherein the step of updating the threshold value includes:

monitoring all tasks passing through the logical ring network; and updating the threshold value when a round trip task is detected.

6. A load balancing method as claimed in claim 5, wherein the step of determining the estimated load value includes:

increasing the task counter by 1 when a task is handed over to the task processing unit, and decreasing the task counter by 1 when a result is returned from the task processing unit; and determining the estimated load value as the value of the task counter.

7. A load balancing method as claimed in claim 1, wherein the step of updating the threshold step includes performing centralized management with respect to the threshold steps of plural processing nodes and updating the threshold step for each node.

8. A load balancing method as claimed in claim 3, wherein the step of updating the threshold step includes performing centralized management with respect to the threshold steps of plural processing nodes and updating the threshold step for each node.

9. A load balancing method as claimed in claim 1, wherein a predetermined value greater than 0 is provided as the threshold value before the load balancing processing is started.

10. A load balancing method as claimed in claim 1, wherein a value acquired by dividing a value with respect to performance of the present node by a value relating to total performance of the entire system, which is a sum of performance values of all nodes in the system, is provided as a threshold step as an amount for changing the threshold value, before the load balancing processing is started.

11. A load balancing method as claimed in claim 1, wherein the step of determining the estimated load value includes:

increasing the task counter by 1 when a task is handed over to the task processing unit, and decreasing the task counter by 1 when a result is returned from the task processing unit; and determining the estimated load value as the value of the task counter.

12. A load balancing method as claimed in claim 1, wherein the step of determining the estimated load value includes calculating a response time of a task according to a time when the task is handed over to the task processing unit and a time when a result relating to the task is returned from the task processing unit, and determining the estimated load value based on the response time.

13. A load balancing method as claimed in claim 12, wherein the estimated load value is defined to be a ratio of said response time to a response time of a case wherein a task is exclusively processed.

14. A load balancing method as claimed in claim 1, wherein the step of determining the estimated load value includes calculating, for a fixed number of tasks or tasks processed in a fixed time, a response time of each task according to a time when the task is handed over to the task processing unit and a time when a result relating to the task is returned from the task processing unit, and determining the estimated load value based on an average of the response times.

15. A load balancing method as claimed in claim 14, wherein the estimated load value is defined to be a ratio of said average of the response time to a response time of a case wherein a task is exclusively processed.

16. A load balancing method as claimed in claim 1, wherein the step of judging whether or not the accepted task is handed over to the task processing unit includes:

comparing the estimated load value of the present node with the threshold value at every arrival of a task;

if the estimated load value is smaller than the threshold value, handing over the task to the task processing unit;

if the estimated load value is equal to or greater than the threshold value, on a particular occasion in that the estimated load value would be smaller than the threshold value by increasing the threshold value, handing over the task to the task processing unit if the task is a round trip task, while if the task is a normal task, inputting the task into the logical ring network.

17. A load balancing method as claimed in claim 1, wherein the step of judging whether or not the accepted task is handed over to the task processing unit includes:

comparing the estimated load value of the present node with the threshold value at every arrival of a task;

if the estimated load value is smaller than the threshold value, handing over the task to the task processing unit; and if the estimated load value is equal to or greater than the threshold value, inputting the task into the logical ring network.

18. A load balancing method as claimed in claim 1, wherein the step of judging whether or not the accepted task is handed over to the task processing unit includes:

comparing the estimated load value of the present node with the threshold value at every arrival of a task, periodically with a fixed period, or with an update of the threshold value or the estimated load value as a trigger, and storing a result of the comparison, and when a task arrives, handing over the task to the task processing unit if a result of the comparison indicating that the estimated load value is smaller than the threshold value is stored; and if the stored result of comparison indicates that the estimated load value is equal to or greater than the threshold value, inputting the task into the logical ring network if the task is a normal task, while if the task is a round trip task and the estimated load value would be smaller than the threshold value by increasing the threshold value, handing over the task to the task processing unit.

19. A load balancing method as claimed in claim 1, wherein the step of judging whether or not the accepted task is handed over to the task processing unit includes:

comparing the estimated load value of the present node with the threshold value at every arrival of a task, periodically with a fixed period, or with an update of the threshold value or estimated load value as a trigger, and if the estimated load value is smaller than the threshold value, or if the estimated load value is equal to or greater than the threshold value and the task is a round trip task and the estimated load value would be smaller than the threshold value by increasing the threshold value, setting a task acceptance control flag to be in an on state;

if the estimated load value is equal to or greater than the threshold value and the task is a normal task, setting the task acceptance control flag to be in an off state; and when a task newly arrives, handing over the task to the task processing unit if the task acceptance control flag is in the on state, while if the task acceptance control flag is in the off state, inputting the task into the logical ring network.

20. A load balancing method as claimed in claim 1, wherein the step of judging whether or not the accepted task is handed over to the task processing unit includes:

comparing the estimated load value of the present node with the threshold value at every arrival of a task, periodically with a fixed period, or with an update of the threshold value or estimated load value as a trigger, and if the estimated load value is smaller than the threshold value, setting a task acceptance control flag to be in an on state;

if the estimated load value is equal to or greater than the threshold value and the task is a normal task, setting the task acceptance control flag to be in an off state; and when a task newly arrives, handing over the task to the task processing unit if the task acceptance control flag is in the on state, while if the task acceptance control flag is in the off state, inputting the task into the logical ring network if the task is a normal task, while if the task is a round trip task and the estimated load value would be smaller than the threshold value by increasing the threshold value, handing over the task to the task processing unit.

21. A load balancing method as claimed in claim 1, wherein the updating of the threshold value is performed in accordance with a change of the number of tasks passing through the logical ring network during a fixed period.

22. A load balancing method as claimed in claim 21, wherein the step of updating the threshold value includes:

determining an estimated load fluctuation of the entire system as a ratio of the number of tasks that have passed through the logical ring network during a fixed measurement period to the number of tasks that passed through the logical ring network during the preceding measurement period; and increasing the threshold value by a predetermined threshold step if the estimated load fluctuation is greater than a predetermined value, while if the estimated load fluctuation is smaller than a predetermined value, decreasing the threshold value by the threshold step.

23. A load balancing method as claimed in claim 1, wherein the step of updating the threshold value includes:

monitoring all tasks passing through the logical ring network; and updating the threshold value when a round trip task is detected.

24. A load balancing method as claimed in claim 23, wherein the step of updating the threshold value includes increasing the threshold value by a predetermined threshold step if a round trip task is detected and the estimated load value is equal to or greater than the threshold value.

25. A load balancing method as claimed in any one of claims 16–20, wherein the comparison of the estimated load value and the threshold value is performed for each self-executable function of the present node.

26. A load balancing apparatus provided for a computer system in which plural processing nodes, whose performance or executable functions are not uniform, are connected to a logical ring network, wherein when each node processes a task input from a terminal by using a task processing unit and returns a result to the terminal, the logical ring network logically transmits tasks in turn and in one direction, said load balancing apparatus, provided between the task processing unit in each node and the logical ring network and equally distributing loads of the entire system into the nodes in the system, the apparatus comprising:

load estimating means for estimating a load of the present node based on the number of tasks being or waiting to be processed and for determining an estimated load value of the present node for each self-executable function of the present node;

threshold value storage means for holding a threshold value with respect to the number of tasks existing in the node to limit the load of the present node based on the performance or self-executable functions of the present node;

task acceptance control means for accepting a task passing through the logical ring network, and for comparing the estimated load value and the threshold value of the node every time the control means accepts a task, and for judging, based on a result of the comparison, whether the accepted task is handed over to the task processing unit, or is transmitted to the logical ring network without handing over the task to the task processing unit; and threshold value updating means for estimating load fluctuation of the entire system and for updating the threshold value according to the estimated load fluctuation of the entire system and to the estimated load value of each self-executable function of the present node.

27. A load balancing apparatus as claimed in claim 26, further comprising threshold step storage means for holding a threshold step which is an amount by which the threshold value is changed by the threshold value updating means.

28. A load balancing apparatus as claimed in claim 27, further comprising threshold step updating means for updating the threshold step stored in the threshold step storage means.

29. A load balancing apparatus as claimed in any one of claims 26, 27, and 28, wherein the load balancing apparatus is disposed in each processing node.

30. A load balancing apparatus as claimed in any one of claims 26, 27, and 28, wherein the load balancing apparatus is disposed outside each processing node.

31. A load balancing apparatus as claimed in claim 27, wherein the threshold step storage means is provided with a value acquired by dividing a value with respect to performance of the present node by a value relating to total performance of the entire system which is a sum of performance values of all nodes in the system, as the threshold step, before the load balancing processing is started.

32. A load balancing apparatus as claimed in claim 28, wherein the threshold step updating means performs centralized management with respect to the threshold steps of plural processing nodes and updates the threshold step stored in the threshold step storage means in each node.

33. A load balancing apparatus as claimed in claim 32, wherein the threshold step updating means is provided in any one of the processing nodes.

34. A load balancing apparatus as claimed in claim 32, wherein the computer system further includes a control node for managing and controlling the system, and the threshold step updating means is provided in the control node.

35. A load balancing apparatus as claimed in claim 28, wherein the threshold step updating means is provided in each processing node, and updates the threshold step stored in the threshold step storage means of the present node.

36. A load balancing apparatus as claimed in claim 28, wherein when organization of the nodes in the computer system is modified by deleting or adding a node, the threshold step updating means updates the threshold step based on a value with respect to performance of the node added or deleted.

37. A load balancing apparatus as claimed in claim 28, wherein the threshold step updating means monitors all tasks passing through the logical ring network, and estimates a load fluctuation of the entire computer system and a modification or organization of the nodes in the system in accordance with a change in the number of all passed tasks and with a change of the number of round trip tasks, and the threshold step updating means updates the threshold step based on a result of the estimate.

38. A load balancing apparatus as claimed in claim 37, wherein the threshold value updating means monitors all tasks passing through the logical ring network, and updates the threshold value when a round trip task is detected.

39. A load balancing apparatus as claimed in claim 38, wherein:
the load estimating means has a task counter, and when a task is handed over to the task processing unit, the load estimating means increases the task counter by 1, while when a result is returned from the task processing unit, the load estimating means decreases the task counter by 1; and
the load estimating means informs the task acceptance control means of the value of the task counter as the estimated load value.

40. A load balancing apparatus as claimed in claim 26, wherein the threshold value updating means performs centralized management with respect to the threshold values of plural processing nodes and updates the threshold value stored in the threshold value storage means in each node.

41. A load balancing apparatus as claimed in claim 40, wherein the threshold value updating means is provided in any one of the processing nodes.

42. A load balancing apparatus as claimed in claim 40, wherein the computer system further includes a control node for managing and controlling the system, and the threshold value updating means is provided in any one of the processing nodes.

43. A load balancing apparatus as claimed in claim 26, wherein the threshold value updating means is provided in each processing node, and updates the threshold value stored in the threshold value storage means of the present node.

44. A load balancing apparatus as claimed in claim 26, wherein the threshold value storage means is provided with a predetermined value greater than 0 as the threshold value before the load balancing processing is started.

45. A load balancing apparatus as claimed in claim 26, wherein:
the load estimating means has a task counter, and when a task is handed over to the task processing unit, the load estimating means increases the task counter by 1, while when a result is returned from the task processing unit, the load estimating means decreases the task counter by 1; and
the load estimating means informs the task acceptance control means of the value of the task counter as the estimated load value.

46. A load balancing apparatus as claimed in claim 26, wherein the load estimating means calculates a response time of a task according to a time when the task is handed over to the task processing unit and a time when a result relating to the task is returned from the task processing unit, and determines the estimated load value based on the response time.

47. A load balancing apparatus as claimed in claim 46, wherein the estimated load value is defined to be a ratio of said response time to a response time of a case wherein a task is exclusively processed.

48. A load balancing apparatus as claimed in claim 26, wherein the load estimating means calculates, for a fixed number of tasks or tasks processed in a fixed time, a response time of each task according to a time when the task is handed over to the task processing unit and a time when a result relating to the task is returned from the task processing unit, and determines the estimated load value based on an average of the response times.

49. A load balancing apparatus as claimed in claim 48, wherein the estimated load value is defined to be a ratio of said average of the response time to a response time of a case wherein a task is exclusively processed.

50. A load balancing apparatus as claimed in claim 26, wherein the task acceptance control means compares the estimated load value of the present node with the threshold value at every arrival of a task; hands over the task to the task processing unit if the estimated load value is smaller than the threshold value; and in another case in which the estimated load value is equal to or greater than the threshold value, on a particular occasion in that the estimated load value would be smaller than the threshold value by increasing the threshold value, the task acceptance control means hands over the task to the task processing unit if the task is a round trip task, while if the task is a normal task, the task acceptance control means inputs the task into the logical ring network.

51. A load balancing apparatus as claimed in claim 26, wherein the task acceptance control means compares the estimated load value of the present node with the threshold value at every arrival of a task; hands over the task to the task processing unit if the estimated load value is smaller than the threshold value; and in another case in which the estimated load value is equal to or greater than the threshold value, the task acceptance control means inputs the task into the logical ring network.

52. A load balancing apparatus as claimed in claim 26, wherein:
the task acceptance control means compares the estimated load value of the present node with the threshold value at every arrival of a task, periodically with a fixed period, or with an update of the threshold value or the estimated load value as a trigger, and the task acceptance control means stores a result of the comparison, and
when a task arrives, the task acceptance control means hands over the task to the task processing unit if a result of the comparison indicating that the estimated load value is smaller than the threshold value is stored; and
in another case in which the stored result of comparison indicates that the estimated load value is equal to or greater than the threshold value, if the task is a normal task, the task acceptance control means inputs the task into the logical ring network, while if the task is a round trip task and the estimated load value would be smaller than the threshold value by increasing the threshold value, the task acceptance control means hands over the task to the task processing unit.

53. A load balancing apparatus as claimed in claim 26, wherein:

the task acceptance control means compares the estimated load value of the present node with the threshold value at every arrival of a task, periodically with a fixed period, or with an update of the threshold value or the estimated load value as a trigger, and if the estimated load value is smaller than the threshold value, or if the estimated load value is equal to or greater than the threshold value and the task is a round trip task and the estimated load value would be smaller than the threshold value by increasing the threshold value, the task acceptance control means sets a task acceptance control flag to be in an on state;

if the estimated load value is equal to or greater than the threshold value and the task is a normal task, the task acceptance control means sets the task acceptance control flag to be in an off state; and when a task newly arrives, if the task acceptance control flag is in the on state, the task acceptance control means hands over the task to the task processing unit, while if the task acceptance control flag is in the off state, the task acceptance control means inputs the task into the logical ring network.

54. A load balancing apparatus as claimed in claim 26, wherein:

the task acceptance control means compares the estimated load value of the present node with the threshold value at every arrival of a task, periodically with a fixed period, or with an update of the threshold value or the estimated load value as a trigger, and if the estimated load value is smaller than the threshold value, the task acceptance control means sets a task acceptance control flag to be in an on state;

if the estimated load value is equal to or greater than the threshold value, the task acceptance control means sets the task acceptance control flag to be in an off state; and when a task newly arrives, the task acceptance control means hands over the task to the task processing unit if the task acceptance control flag is in the on state, while if the task acceptance control flag is in the off state, the task acceptance control means inputs the task into the logical ring network if the task is a normal task, while if the task is a round trip task and the estimated load value would be smaller than the threshold value by increasing the threshold value, the task acceptance control means hands over the task to the task processing unit.

55. A load balancing apparatus as claimed in any one of claims 50–54, wherein the task acceptance control means performs the comparison of the estimated load value and the threshold value for each self-executable function of the present node.

56. A load balancing apparatus as claimed in claim 26, wherein the threshold value updating means updates the threshold value in accordance with a change in the number of tasks passing through the logical ring network during a fixed period.

57. A load balancing apparatus as claimed in claim 56, wherein the threshold value updating means determines an estimated load fluctuation of the entire system as a ratio of the number of tasks that have passed through the logical ring network during a fixed measurement period to the number of tasks that passed through the logical ring network during the preceding measurement period; and if the estimated load fluctuation is greater than a predetermined value, the threshold value updating means increases the threshold value by a predetermined threshold step, while if the estimated load fluctuation is smaller than a predetermined value, the threshold value updating means decreases the threshold value by the threshold step.

58. A load balancing apparatus as claimed in claim 56, further comprising threshold step storage means for holding a threshold step, which is a unit for changing the threshold value by the threshold value updating means, wherein:

the threshold value updating means determines an estimated load fluctuation of the entire system as a ratio of the number of tasks that have passed through the logical ring network during a fixed measurement period to the number of tasks that passed through the logical ring network during the preceding measurement period; and if the estimated load fluctuation is greater than a predetermined value, the threshold value updating means increases the threshold value by the threshold step in the threshold step storage means, while if the estimated load fluctuation is smaller than a predetermined value, the threshold value updating means decreases the threshold value by the threshold step.

59. A load balancing apparatus as claimed in claim 26, wherein the threshold value updating means monitors all tasks passing through the logical ring network, and updates the threshold value when a round trip task is detected.

60. A load balancing apparatus as claimed in claim 59, wherein the threshold value updating means increases the threshold value by a predetermined threshold step if a round trip task is detected and the estimated load value is equal to or greater than the threshold value.

61. A load balancing apparatus as claimed in claim 59, further comprising threshold step storage means for holding a threshold step, which is a unit for changing the threshold value by the threshold value updating means, wherein:

the threshold value updating means increases the threshold value by the predetermined threshold step stored in the threshold step storage means if a round trip task is detected and the estimated load value is equal to or greater than the threshold value.

62. A storage medium storing a computer program for making a computer execute any one of the methods claimed in any one of claims 2–10, 11–20 and 21–6.

63. A storage medium storing a computer program for making a computer execute the method claimed in claim 25.

* * * * *